United States Patent
Ang et al.

(10) Patent No.: US 11,516,800 B2
(45) Date of Patent: Nov. 29, 2022

(54) BANDWIDTH PART (BWP) CONFIGURATION FOR FULL DUPLEX

(71) Applicant: QUALCOMM Incorporated, San Diego, CA (US)

(72) Inventors: Peter Pui Lok Ang, San Diego, CA (US); Muhammad Sayed Khairy Abdelghaffar, San Jose, CA (US); Huilin Xu, San Diego, CA (US); Hung Dinh Ly, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 16/838,713

(22) Filed: Apr. 2, 2020

(65) Prior Publication Data
US 2021/0314946 A1 Oct. 7, 2021

(51) Int. Cl.
*H04W 72/04* (2009.01)
*H04L 5/14* (2006.01)

(52) U.S. Cl.
CPC ............ *H04W 72/0453* (2013.01); *H04L 5/14* (2013.01)

(58) Field of Classification Search
None
See application file for complete search history.

(56) References Cited

U.S. PATENT DOCUMENTS

| 2012/0099558 | A1 | 4/2012 | Skov et al. |
| 2012/0250591 | A1 | 10/2012 | Diao et al. |
| 2020/0367229 | A1* | 11/2020 | Shen ................. H04W 72/0406 |
| 2021/0067234 | A1* | 3/2021 | Guan ................. H04W 72/046 |

(Continued)

OTHER PUBLICATIONS

Bhandari S., et al., "Spectrum Sharing in Cognitive Radio Networks for5G Vision", 2019 Second International Conference on Advanced Computational and Communication Paradigms (ICACCP), IEEE, Feb. 25, 2019 (Feb. 25, 2019), pp. 1-6, XP033650603, DOI: 10.1109/ICACCP.2019.8882975 [retrieved on Oct. 24, 2019] Abstract Sections I, II.A, III.

(Continued)

*Primary Examiner* — Saba Tsegaye
(74) *Attorney, Agent, or Firm* — Qualcomm Incorporated

(57) ABSTRACT

Bandwidth part (BWP) configurations supporting various communication approaches (e.g., full duplex and/or half duplex operations) are described. Full duplex (FD) frequency-based BWP configurations may, for example, be configured as a subset of defined BWP resources for supporting full duplex operation by base stations and/or user equipments (UEs). Usable bandwidth of a FD frequency-based BWP configuration may be selected from half duplex frequency-based BWPs in legacy BWPs. Bandwidths of usable BWPs for a FD frequency-based BWP configuration may be selected so as to be non-overlapping in frequency. Transition between configurations and modes (e.g., between full duplex frequency-based BWP configurations, between half duplex and full duplex modes, etc.) may be managed to avoid periods in which a communication device cannot perform any uplink or downlink transmissions due to switching between defined BWP configurations, or otherwise reduces BWP switching time. Other aspects and features are also claimed and described.

30 Claims, 15 Drawing Sheets

(56) References Cited

U.S. PATENT DOCUMENTS

2021/0092762 A1\* 3/2021 Choi .................... H04L 1/1893
2021/0135770 A1\* 5/2021 Schober ................ H04B 17/14
2021/0352656 A1\* 11/2021 Choi .................... H04L 5/0094

OTHER PUBLICATIONS

Caict., et al., "General Sections Updated to 38.521-2", 3GPP Draft, 38521-2CROO29R1_(REL-15)_R5-187842_6740 General Sections Updated to 38.521-2, 3rd Generation Partnership Project (3GPP), Mobile Competence Centre, 650, Route Des Lucioles, F-06921 Sophia-Antipolis Cedex, France, vol. RAN WG5, No. Spokane, Washington, USA, 20181112 -20181116, Dec. 9, 2018 (Dec. 9, 2018), 24 Pages, XP051551857, Retrieved from the Internet: URL: http://www.3gpp.org/ftp/Meetings%5F3GPP%5FSYNC/RAN/Docs/RP%2D182272%2Ezip, [retrieved on Dec. 9, 2018], Tables 5.1-1, 5.2-1, 5.3A.4-1, 5.5A.2-1, 5.5A.2-2, Figures 5.3A.2-2, Sections 3.1, 3.3, 5.1, 5.3.1, 5.3.2, 5.3.5, 5.3A.2, 5.3A.4.

Huawei, et al., "Overview of Rel-17 Work Areas for NR and LTE", 3GPP TSG RAN Meeting #84, RP-191486, Overview of Rel-17 Work Areas for NR and LTE Final (WAS RP-191007), 3rd Generation Partnership Project (3GPP), Mobile Competence Centre, 650, Route Des Lucioles, F-06921, Sophia-Antipolis, vol. TSG RAN, No. Newport Beach, USA, 20190603-20190606, Jun. 4, 2019 (Jun. 4, 2019), 22 Pages, May 29, 2019 (May 29, 2019, XP051748412, Retrieved from the Internet: URL: http://www.3gpp.org/ftp/Meetings%5F3GPP%5FSYNC/RAN/Docs/RP%2D191486%2Ezip [retrieved on Jun. 4, 2019], Section Mobility Enhancements, in Particular p. 13, the Paragraphs Below Figure 3, the whole document, Section "Mobility Enhancements", [retrieved on May 29, 2019] p. 12-p. 13, p. 16-p. 18, p. 16-p. 17.

International Search Report and Written Opinion—PCT/US2021/024852—ISA/EPO—Oct. 11, 2021 (200177WO).

NTT Docomo., et al., "Maintenance for Physical Downlink Control Channel", 3GPP TSG RAN WG1 Meeting #94bis, 3GPP Draft, R1-1811373 Maintenance for PDCCH, 3rd Generation Partnership Project (3GPP), Mobile Competence Centre, 650, Route Des Lucioles, F-06921 Sophia-Antipolis Cedex, France, vol. RAN WG1, No. Chengdu, China; 20181008-20181012, Sep. 29, 2018 (Sep. 29, 2018), 5 Pages, XP051518777, Retrieved from the Internet: URL: http://www.3gpp.org/ftp/tsg%5Fran/WG1%5FRL1/TSGR1%5F94b/Docs/R1 %2D1811373%2Ezip, [retrieved on Sep. 29, 2018], Sections 3.1, 3.3, 4.

"Recommendation ITU-R M, [IMT-2020. SPEC] [Detailed Specifications of the Terrestrial Radio Interfaces of International Mobile Telecommunications-2020 (IMT-2020)]", 3GPP Draft, RP-200486, 3rd Generation Partnership Project (3GPP), Mobile Competence Centre, 650, Route Des Lucioles, F-06921 Sophia-Antipolis Cedex, France, vol. Mar. 19, 2020 (Mar. 19, 2020), 42 PXP051867301, Retrieved from the Internet: URL: https://ftp.3gpp.org/tsg_ran/TSG_RAN/TSGR_87e/Docs/RP-200486.zip, SRIT Section I.docx [retrieved on Mar. 19, 2020], Figures 1.9, 1.24 sections 1, 1.1, 1.1.3.2, 1.1.3.3.

Sexton C., et al., "5G: Adaptable Networks Enabled by Versatile Radio Access Technologies", IEEE Communications Surveys & Tutorials, vol. 19, No. 2, Jun. 2, 2017 (Jun. 2, 2017), pp. 688-720, XP011651813, DOI: 10.1109/COMST.2017.2652495, [retrieved on Jun. 2, 2017], Figures 2, 3 Sections II.A, III.C, IV.B.

\* cited by examiner

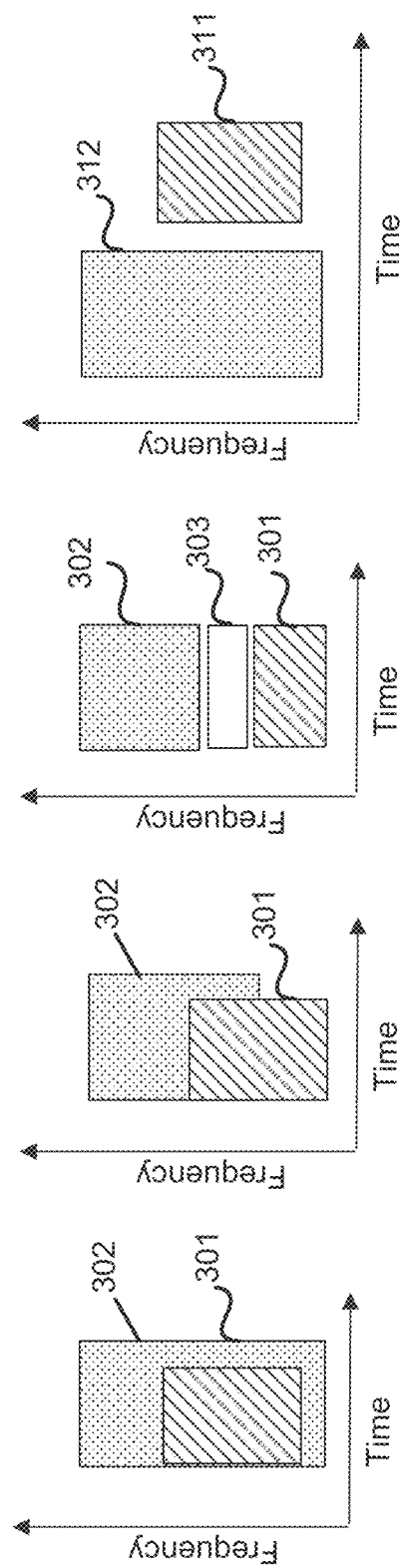

BANDWIDTH PART (BWP) CONFIGURATION FOR FULL DUPLEX

TECHNICAL FIELD

Aspects of the present disclosure relate generally to wireless communication systems, and more particularly, to bandwidth part (BWP) configuration for full duplex communications. Certain embodiments of the technology discussed below can enable and provide for full duplex frequency-based BWP configurations (e.g., including a plurality of half duplex frequency-based BWPs comprising a subset of bandwidth of corresponding defined BWPs).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. A method may include providing a first full duplex (FD) frequency-based bandwidth part (BWP) configuration. The FD frequency-based BWP configuration may include a plurality of BWPs. Individual BWPs of the plurality of BWPs may include a subset of bandwidth, of a corresponding defined BWP, configured for FD operation. A method may also include assigning the first FD frequency-based BWP configuration to configure one or more communications devices for communication during the FD operation.

In another aspect, another method of wireless communication is provided. Such a method can include assigning FD BWP configurations to one or more communication devices for communications during FD communication. A method may also include signaling indications of assigned configurations to one or more communication devices. Indications may include information (e.g., control or data), to indicate to one or more communication devices a first FD frequency-based BWP configuration and/or a plurality of BWPs. One or more of the BWPs can comprise a subset of bandwidth, and the bandwidth subset may correspond to a defined BWP.

In an additional aspect of the disclosure, an apparatus configured for wireless communication is provided. An apparatus may include means for providing a FD frequency-based BWP configuration. The FD frequency-based BWP configuration may include a plurality of BWPs. Individual BWPs of the plurality of BWPs may include a subset of bandwidth, of a corresponding defined BWP, configured for FD operation. An apparatus may also include means for assigning the first FD frequency-based BWP configuration to configure one or more communications devices for communication during the FD operation.

In an additional aspect of the disclosure, a non-transitory computer-readable medium having program code recorded thereon is provided. Program code may include code to provide a first FD frequency-based BWP configuration. The FD frequency-based BWP configuration may include a plurality of BWPs. Individual BWPs of the plurality of BWPs may include a subset of bandwidth, of a corresponding defined BWP, configured for FD operation. Program code may also include code to assign the first FD frequency-based BWP configuration to configure one or more communications devices for communication during the FD operation.

In an additional aspect of the disclosure, an apparatus configured for wireless communication is provided. The apparatus includes at least one processor, and a memory coupled to the processor. A processor may be configured to provide a first FD frequency-based BWP configuration. The FD frequency-based BWP configuration may include a plurality of BWPs. Individual BWPs of the plurality of BWPs may include a subset of bandwidth, of a corresponding defined BWP, configured for FD operation. A processor may also be configured to assign the first FD frequency-based BWP configuration to configure one or more communications devices for communication during the FD operation.

In another aspect, another wireless communication device is provided. Such a device can be configured to assign FD BWP configurations to one or more communication devices for communications during FD communication. Assignments may be made via the device's communication interface (e.g., transceiver) and a processor implementing one or more instructions. A device may also include a device's communication interface signaling indications of assigned configurations to one or more communication devices. Indications may include information (e.g., control or data), to indicate to one or more communication devices a first full duplex (FD) frequency-based bandwidth part (BWP) configuration and/or a plurality of BWPs. One or more of the BWPs can comprise a subset of bandwidth, and the bandwidth subset may correspond to a defined BWP.

In accordance with aspects of the disclosure, the foregoing systems, methods, and apparatuses may be implemented in combination with one or more additional features, such as the following features whether alone or in combination. For example, the above systems, methods, and apparatuses may include at least one of the individual BWPs providing a segmented BWP configuration having non-contiguous bandwidth portions. The above systems, methods, and apparatuses may include the plurality of BWPs having a first BWP configuration including a first bandwidth of a downlink half duplex (HD) BWP of the defined BWP and a second BWP configuration including a second bandwidth of an uplink HD BWP of the defined BWP that are non-overlapping in frequency, wherein at least one of the first bandwidth or the second bandwidth includes a subset of a respective one of the downlink HD BWP or uplink HD BWP, and wherein the assigning the first FD frequency-based BWP configuration for FD wireless communication includes assigning the first BWP configuration for a downlink of the FD wireless communication and assigning the second BWP configuration for an uplink of the FD wireless communication. The above systems, methods, and apparatuses may include the downlink HD BWP of the defined BWP and the uplink HD BWP of the defined BWP at least partially overlapping in frequency, wherein the first bandwidth of the first BWP configuration and the second bandwidth of the second BWP configuration are non-overlapping portions of the downlink HD BWP and the uplink HD BWP of the defined BWP. The above systems, methods, and apparatuses may include the downlink HD BWP of the defined BWP and the uplink HD BWP of the defined BWP being non-overlapping in frequency, wherein the first bandwidth of the first BWP configuration and the second bandwidth of the second BWP configuration are non-overlapping portions of the downlink HD BWP and the uplink HD BWP of the defined BWP separated by a guard band defined at least in part by the subset bandwidth of the respective one of the downlink HD BWP or uplink HD BWP. The above systems, methods, and apparatuses may include providing a plurality of uplink and downlink BWP pair sets each including a plurality of BWPs, wherein the first FD frequency-based BWP configuration is an uplink and downlink BWP pair set of the plurality of uplink and downlink BWP pair sets. The above systems, methods, and apparatuses may include two or more uplink and downlink BWP pair sets of the plurality of uplink and downlink BWP pair sets being defined for bandwidth of a downlink HD BWP of the defined BWP and bandwidth of the uplink HD BWP of the BWP. The above systems, methods, and apparatuses may include the two or more uplink and downlink BWP pair sets defined for the bandwidth of the downlink HD BWP and the uplink HD BWP of the BWP including a first uplink and downlink BWP pair set configured to support FD operation and a second uplink and downlink BWP pair set configured to support HD operation. The above systems, methods, and apparatuses may include the two or more uplink and downlink BWP pair sets defined for the bandwidth of the downlink HD BWP and the uplink HD BWP of the BWP expanding the downlink BWP to at least a first BWP configuration configured to support FD operation and a second BWP configuration configured to support HD operation and expanding the uplink BWP to at least a third BWP configuration configured to support FD operation and a fourth BWP configuration configured to support HD operation. The above systems, methods, and apparatuses may include the assigning the first FD frequency-based BWP configuration assigns a first BWP configuration of the FD frequency-based BWP configuration to a communication device for communication of FD slots or symbols, and assigning a second BWP configuration to the communication device for communication of HD slots or symbols, wherein transitioning between FD operation and HD operation is based on a duplexing nature of a respective slot or symbol. The above systems, methods, and apparatuses may include the assigning the first FD frequency-based BWP configuration assigning a first portion of a first BWP configuration of the first FD frequency-based BWP configuration to a first HD mode communication device communicating with a FD mode communication device, a second portion of the first BWP configuration of the first FD frequency-based BWP configuration to a second HD mode communication device communicating with the FD mode communication device, and at least a portion of a second BWP configuration of the FD frequency-based BWP configuration to a third HD mode communication device communicating with the FD mode communication device. The above systems, methods, and apparatuses may include the assigning the first FD frequency-based BWP configuration assigning a first portion of a first BWP configuration of the first FD frequency-based BWP configuration to a first HD mode communication device communicating with a FD mode communication device, a second portion of the first BWP configuration of the first FD frequency-based BWP configuration to a first FD mode communication device communicating with the FD mode communication device, and at least a portion of a second BWP configuration of the FD frequency-based BWP configuration to the first FD mode communication device.

In one aspect of the disclosure, a method of wireless communication is provided. A method may include obtaining a first FD frequency-based BWP configuration. The FD frequency-based BWP configuration may include a plurality of BWPs. Individual BWPs of the plurality of BWPs may include a subset of bandwidth, of a corresponding defined BWP, configured for FD operation. A method may also include communicating during the FD operation using a first one or more BWPs of the first FD frequency-based BWP configuration.

In an additional aspect of the disclosure, an apparatus configured for wireless communication is provided. An apparatus may include means for obtaining a first FD frequency-based BWP configuration. The FD frequency-based BWP configuration may include a plurality of BWPs. Individual BWPs of the plurality of BWPs may include a subset of bandwidth, of a corresponding defined BWP, configured for FD operation. An apparatus may also include means for communicating during the FD operation using a first one or more BWPs of the first FD frequency-based BWP configuration.

In an additional aspect of the disclosure, a non-transitory computer-readable medium having program code recorded thereon is provided. Program code may include code to obtain a first FD frequency-based BWP configuration. The FD frequency-based BWP configuration may include a plurality of BWPs. Individual BWPs of the plurality of BWPs may include a subset of bandwidth, of a corresponding defined BWP, configured for FD operation. Program code may also include code to communicate during the FD operation using a first one or more BWPs of the first FD frequency-based BWP configuration.

In an additional aspect of the disclosure, an apparatus configured for wireless communication is provided. The apparatus includes at least one processor, and a memory coupled to the processor. A processor may be configured to obtain a first FD frequency-based BWP configuration. The FD frequency-based BWP configuration may include a plurality of BWPs. Individual BWPs of the plurality of BWPs may include a subset of bandwidth, of a corresponding defined BWP, configured for FD operation. A processor may also be configured to communicate during the FD operation using a first one or more BWPs of the first FD frequency-based BWP configuration.

In accordance with aspects of the disclosure, the foregoing systems, methods, and apparatuses may be implemented in combination with one or more additional features, such as the following features whether alone or in combination. For example, the above systems, methods, and apparatuses may include at least one of the individual BWPs having a segmented BWP configuration having non-contiguous bandwidth portions. The above systems, methods, and apparatuses may include the FD frequency-based BWP configuration having a first BWP configuration including a first bandwidth of a downlink HD BWP of the defined BWP and a second BWP configuration including a second bandwidth of the uplink HD BWP of the defined BWP that are non-overlapping in frequency, wherein at least one of the first bandwidth or the second bandwidth comprises a subset of a respective one of the downlink HD BWP or uplink HD BWP. The above systems, methods, and apparatuses may include the downlink HD BWP of the defined BWP and the uplink HD BWP of the defined BWP being at least partially overlapping in frequency, wherein the first bandwidth of the first BWP configuration and the second bandwidth of the second BWP configuration are non-overlapping portions of the downlink HD BWP and the uplink HD BWP of the defined BWP. The above systems, methods, and apparatuses may include the downlink HD BWP of the defined BWP and the uplink HD BWP of the defined BWP being non-overlapping in frequency, wherein the first bandwidth of the first BWP configuration and the second bandwidth of the second BWP configuration are non-overlapping portions of the downlink HD BWP and the uplink HD BWP of the defined BWP separated by a guard band defined at least in part by the subset bandwidth of the respective one of the downlink HD BWP or uplink HD BWP. The above systems, methods, and apparatuses may include the first BWP configuration having an uplink and downlink BWP pair set of a plurality of uplink and downlink BWP pair sets including a plurality of BWPs. The above systems, methods, and apparatuses may include two or more uplink and downlink BWP pair sets being defined for the bandwidth of the downlink HD BWP and the uplink HD BWP of the defined BWP including a first uplink and downlink BWP pair set configured to support FD operation and a second uplink and downlink BWP pair set configured to support HD operation. The above systems, methods, and apparatuses may include two or more uplink and downlink BWP pair sets being defined for the bandwidth of the downlink HD BWP and the uplink HD BWP of the defined BWP expanding the downlink BWP to at least a first BWP configuration configured to support FD operation and a second BWP configuration configured to support HD operation and expanding the uplink BWP to at least a third BWP configuration configured to support FD operation and a fourth BWP configuration configured to support HD operation. The above systems, methods, and apparatuses may include the communicating during FD wireless communication operation using the first FD frequency-based BWP configuration is for communication of FD slots or symbols, and communicating during HD operation using a second one or more BWPs of a second BWP configuration for communication of HD slots or symbols, wherein transitioning between FD operation and HD operation is based on a duplexing nature of a respective slot or symbol. The above systems, methods, and apparatuses may include defaulting to a HD BWP configuration of the defined BWP upon expiration of a BWP inactivity timer.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 3A-3D illustrate various configurations of duplex modes as may be utilized by wireless communication stations according to some aspects of the present disclosure.

DETAILED DESCRIPTION

Figure 1:
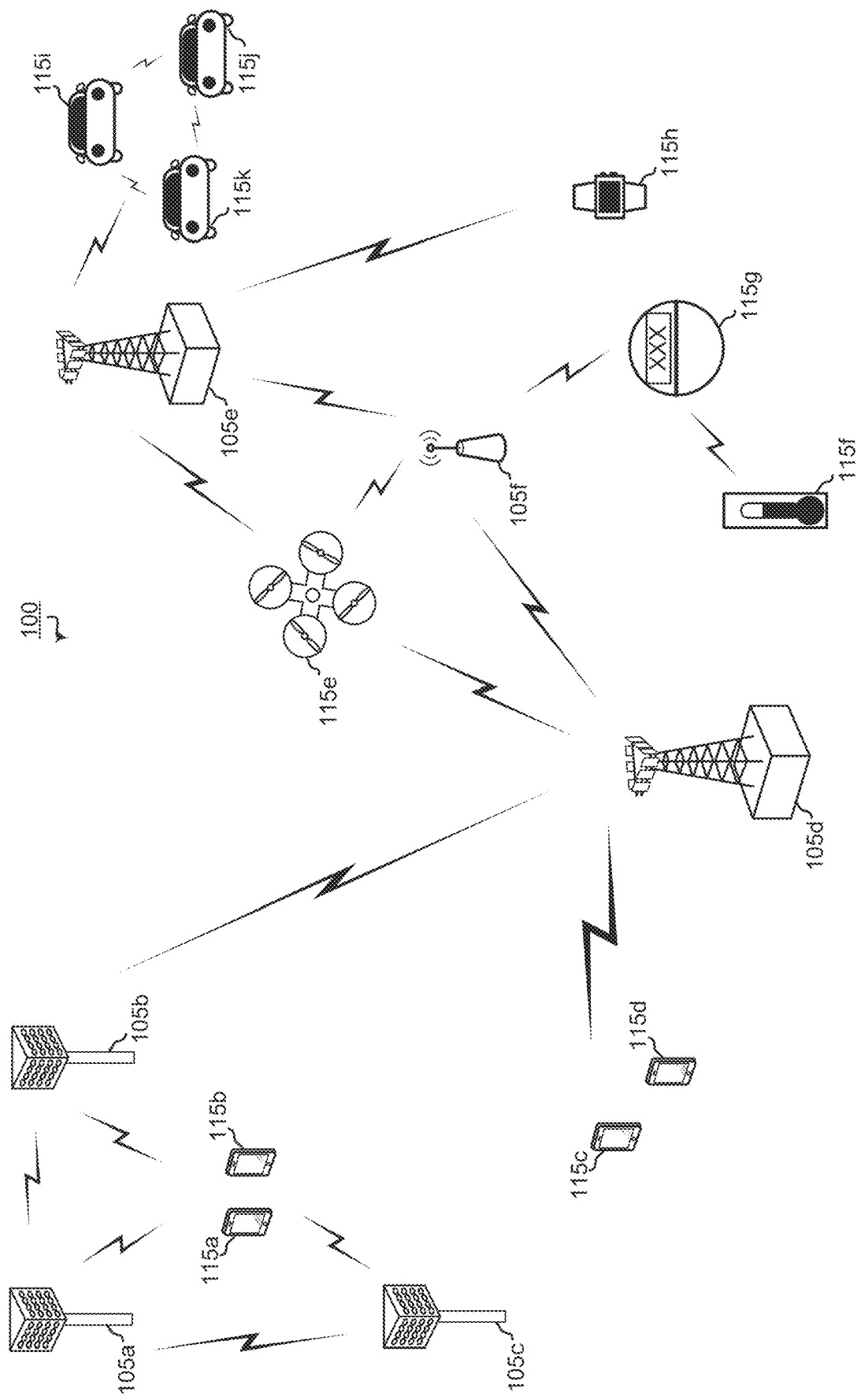
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carder FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3$^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/ small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3$^{rd}$ Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, a vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
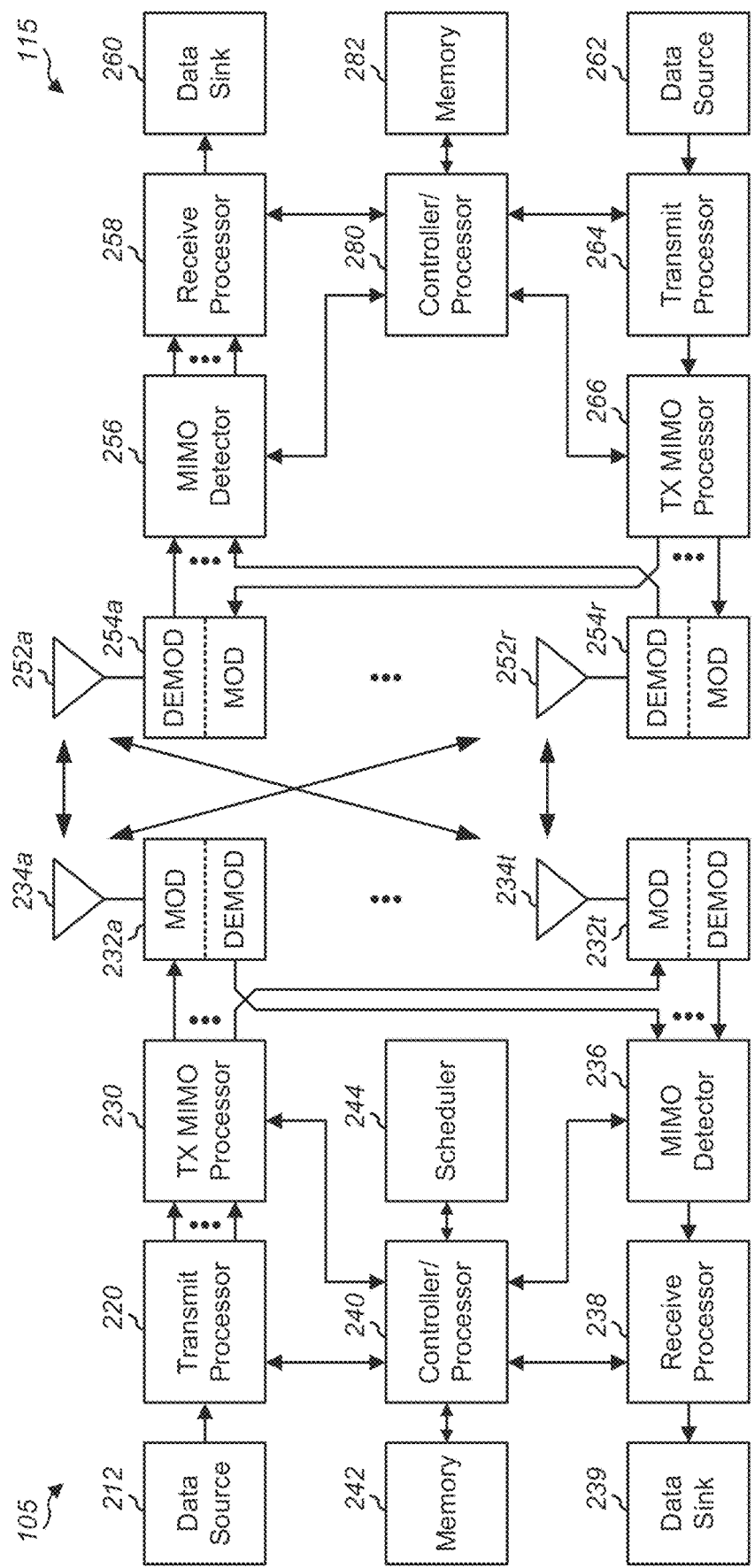
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 11 and 12, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Bandwidth parts (BWPs) may be used in a variety of arrangements or manners in various communication scenarios. BWPs can be used to enable flexibility in how resources are assigned (e.g., in a given carrier). BWPs may vary in size and structure. As one example, a BWP may be a subset of contiguous common physical resource blocks (PRBs) of a component carrier in which multiple, different signal types can be sent. In other scenarios, one or more BWPs may be arranged in a spaced out or non-contiguous manner. Generally BWPs can enable multiplexing of different signals and signal types, such as for better utilization and adaptation of spectrum and UE power.

BWPs may also have a variety of operational characteristics. For example, each BWP may be defined with one or more of its own numerology, frequency location, bandwidth size, and control resource set (CORESET). In some scenarios, additionally or alternatively, BWPs can be configured differently and/or uniquely with its own signal characteristic(s). Generally, one defined BWP may be active in the uplink and one defined BWP may be active in the downlink at a given time. Also in some instances, for an activated cell, there is an active downlink BWP for the downlink carrier and an active uplink BWP for the uplink carrier. The active BWP can be one of the defined BWPs, and the base station can switch the active BWP to another defined BWP (e.g., timer-based, downlink control information (DCI) based, or radio resource control (RRC) signaling).

Wireless devices (e.g., one or more of UEs 115 and/or base station 105) of wireless network 100 may operate in half duplex mode or full duplex mode. FIGS. 3A-3C illustrate various configurations of full duplex modes in a single component carrier as may be utilized by wireless communication stations of 5G network 100. Correspondingly, FIG. 3D illustrates a configuration of a half duplex mode as may be utilized by wireless communication stations of 5G network 100. It should be appreciated that FIGS. 3A-3D present examples with respect to duplex mode configurations that may be utilized and are not intended to be limiting with respect to the particular duplex mode configurations that may be utilized by wireless communication stations that may implement full duplex operation according to concepts of the disclosure.

As can be seen in FIGS. 3A-3C, uplink signals 301 of the full duplex modes overlap downlink signals 302 in time. That is, in these examples, a wireless communication station implementing a full duplex mode with respect to wireless communications transmits and receives at the same time. In contrast, a wireless communication station implementing a half duplex mode of the example of FIG. 3D transmits and receives at different times. Accordingly, uplink signal 311 of the example half duplex mode shown in FIG. 3D does not overlap downlink single 312 in time.

Various configurations may be utilized with respect to a full duplex mode, as represented by the examples of FIGS. 3A-3C. For example, FIGS. 3A and 3B show examples of in-band full duplex, wherein uplink signals 301 of the full duplex modes overlap downlink signals 302 in time and frequency. That is the uplink signals and downlink signals at least partially share the same time and frequency resource (e.g., full or partial overlap of the uplink and downlink signals in the time and frequency domains). In another configuration of a full duplex mode, FIG. 3C shows an example of sub-band full duplex, wherein uplink signal 301 of the full duplex mode overlaps downlink signal 302 in time, but not in frequency. That is the uplink signals and downlink signals at least partially share the same time resource (e.g., full or partial overlap of the uplink and downlink signals in the time domain), but do not share the same frequency resource. In the example illustrated in FIG. 3C, uplink signal 301 and downlink signal 302 are separated in the frequency domain by guard band 303 (e.g., a relatively narrow amount of frequency spectrum separating the frequency band occupied by the uplink and downlink signals).

Figure 4B:
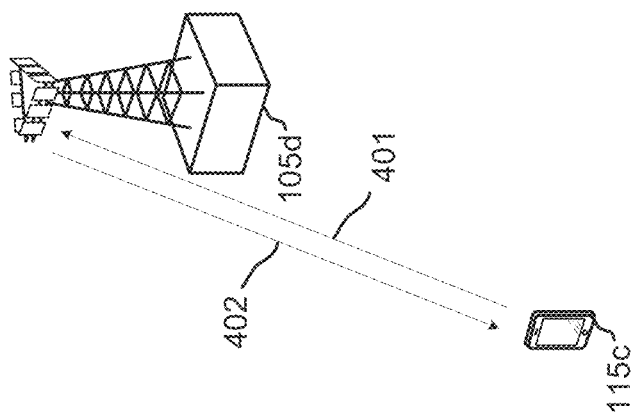
FIGS. 4A-4C illustrate instances of self-interference introduced by full duplex wireless communications according to some aspects of the present disclosure.
Figure 4A:
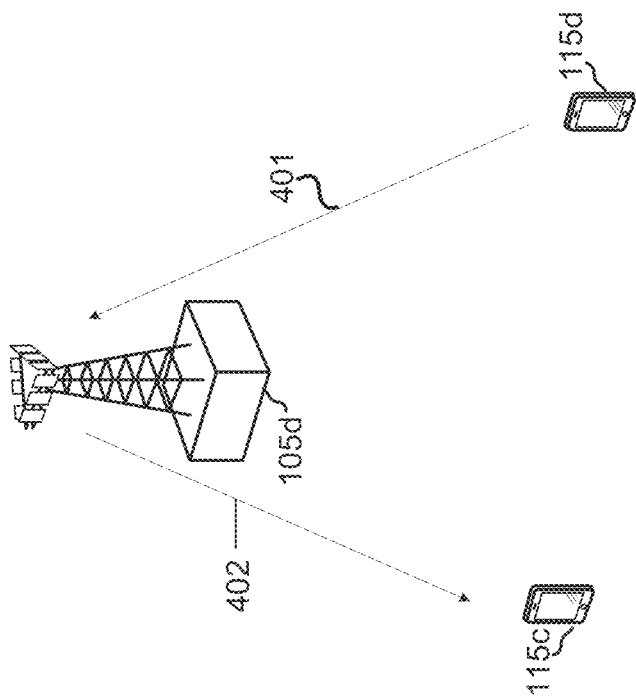
Figure 4C:
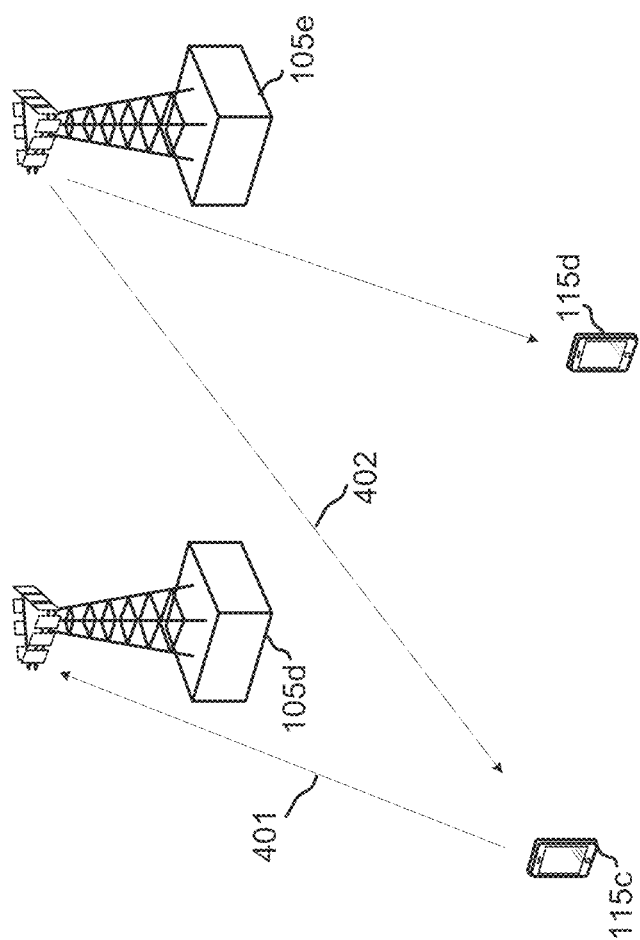

FIGS. 4A-4C illustrate example instances of the use of full and half duplex modes in wireless communications. It should be appreciated that FIGS. 4A-4C represent a portion of 5G network 100 selected for illustrating the use of full and half duplex modes and that the particular base stations and UEs depicted are not intended to be limiting with respect to the various wireless communication stations that may implement the various duplex modes according to concepts of the disclosure.

In the example of FIG. 4A, base station 105d is operating in a full duplex mode while UEs 115c and 115d are operating in a half duplex mode. In this example, base station 105d receives uplink signal 401 from UE 115d and transmits downlink signal 402 to UE 115c using a shared time resource (e.g., simultaneous downlink and uplink transmission), and possibly a shared frequency resource.

In the example of FIG. 4B, base station 105d and UE 115c are each operating in a full duplex mode. In this example, UE 115c transmits uplink signal 401 and receives downlink signal 402 using a shared time resource (e.g., simultaneous downlink and uplink transmission), and possibly a shared frequency resource.

In the example of FIG. 4C, UE 115c is operating in a full duplex mode (e.g., implementing a multiple transmission and reception (multi-TRP) architecture). As with the example of FIG. 4B, UE 115c transmits uplink signal 401 and receives downlink signal 402 using a shared time resource (e.g., simultaneous downlink and uplink transmission), and possibly a shared frequency resource.

BWP configurations supporting full duplex operation are defined according to embodiments of the present disclosure. Full duplex frequency-based BWP configurations may, for example, be configured as a subset of defined BWP resources for supporting full duplex operation by base stations (e.g., supporting full duplex communications in the examples of FIGS. 4A and 4B) and/or UEs (e.g., supporting full duplex communications in the examples of FIGS. 4B and 4C). Transition between configurations and modes (e.g., between full duplex frequency-based BWP configurations, between half duplex and full duplex modes, etc.) is managed according to embodiments to avoid periods in which a communication device cannot perform any uplink or downlink transmissions due to switching between defined BWP configurations, or otherwise reduces BWP switching time.

In operation of wireless communication within wireless network 100, some communication frame time slots can be designated as full duplex and others can be designated as half duplex. For half duplex slots, the downlink and uplink transmissions may be timewise non-overlapping (e.g., occur separated in time, like TDD operation). Component carrier bandwidth may thus be allocated for either downlink or uplink communications with respect to a half duplex time slot. For full duplex slots, the downlink and uplink transmissions may overlap in time (e.g., occur simultaneously, like FDD operation). Component carrier bandwidth may thus be divided into portions for downlink and uplink communications with respect to a full duplex time slot.

In accordance with some aspects of the disclosure, full duplex frequency-based BWP configurations can provide one or more active BWPs. For example, in some scenarios, these configurations may provide two active BWPs (e.g., one for the downlink and one for the uplink). The configurations for BWPs may be provided for any particular time slot or symbol. As described above, full duplex operation according to embodiments enables and supports downlink and uplink transmissions overlapping in time (e.g., simultaneous downlink and uplink transmissions). Accordingly, the full duplex frequency-based BWP configurations of embodiments implement one or more constraints with respect to the bandwidth and frequency location, such as to define non-overlapping portions of BWP frequency resources and/or one or more guard bands. Embodiments of the present disclosure provide for full duplex frequency-based BWP configurations that include a plurality BWPs, comprising a subset of bandwidth of a corresponding defined BWP, that are usable for full duplex operation.

Figure 5C:
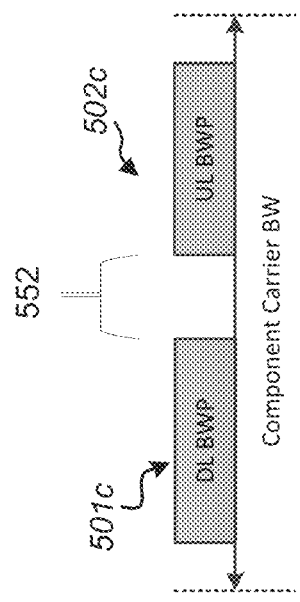
FIGS. 5C and 5D illustrate examples of non-overlapping bandwidth with respect to defined BWPs according to some aspects of the present disclosure.
Figure 5D:
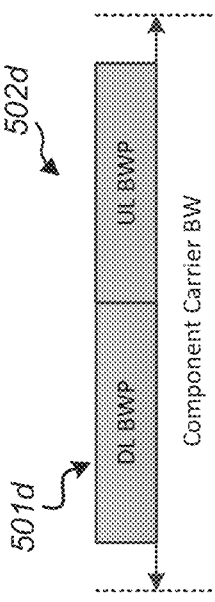
Figure 5A:
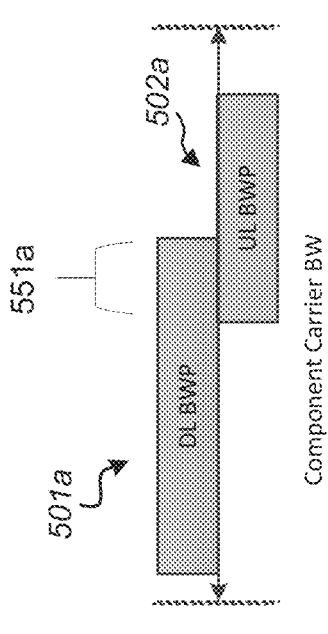
FIGS. 5A and 5B illustrate examples of overlapping bandwidth with respect to defined BWPs according to some aspects of the present disclosure.
Figure 5B:
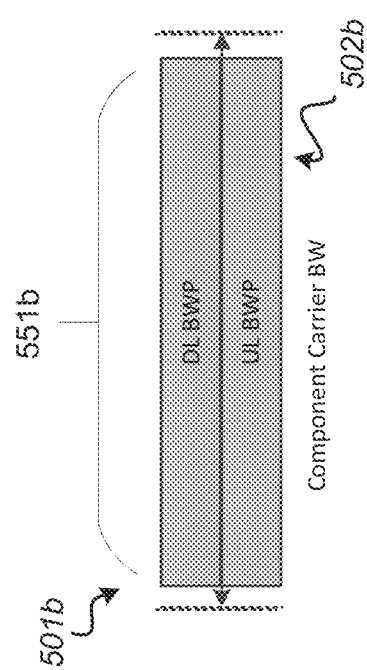

Defined BWPs (e.g., legacy downlink and uplink half duplex BWPs) can be situated in various arrangements with respect to each other. In some scenarios, BWPs may be overlapping or non-overlapping with respect to frequency and/or time. FIGS. 5A and 5B illustrate examples of overlapping bandwidth with respect to defined BWPs. In the examples, downlink BWP 501 and uplink BWP 502 are defined so as to comprise a common portion (overlap 551) of the component carrier bandwidth. The bandwidth overlap with respect to the defined BWPs may be partial, as shown in FIG. 5A (e.g., overlap 551a is less than the bandwidth of at least one of downlink BWP 501a and uplink BWP 502a). Alternatively or additionally, the bandwidth overlap with respect to the defined BWPs may be full, as shown in FIG. 5B (e.g., overlap 551b is the full bandwidth of downlink BWP 501b and uplink BWP 502b). FIGS. 5C and 5D illustrate examples of non-overlapping bandwidth with respect to defined BWPs. In the examples, downlink BWP 501 and uplink BWP 502 are defined so as to comprise no common portions of the component carrier bandwidth. The non-overlapping bandwidth with respect to the defined BWPs may be non-contiguous, as shown in FIG. 5C (e.g., having gap 552 between the bandwidth of downlink BWP 501c and the bandwidth of uplink BWP 502c). Alternatively, the non-overlapping bandwidth with respect to the defined BWPs may be contiguous, as shown in FIG. 5D (e.g., having no gap between the bandwidth of downlink BWP 501d and the bandwidth of uplink BWP 502d).

Irrespective of the particular configuration of defined BWPs (e.g., partially overlapping uplink/downlink BWPs, fully overlapping uplink/downlink BWPs, non-contiguous non-overlapping uplink/downlink BWPs, or contiguous non-overlapping uplink/downlink BWPs), usable BWPs of a full duplex frequency-based BWP configuration may be defined according to embodiments of the present disclosure. These variable and varied configuration types can provide a subset of bandwidth of corresponding defined BWPs supporting full duplex operation of a full duplex frequency-based BWP configuration. Accordingly, BWPs comprising bandwidth and frequency location constrained subsets of resources from active downlink half duplex and uplink half duplex defined BWPs can be used simultaneously (e.g., in the same time slot, the same symbol, etc.) for full duplex operation of a full duplex frequency-based BWP configuration.

In providing a full duplex frequency-based BWP configuration according to some aspects of the disclosure, the full duplex usable bandwidth (e.g., subsets of BWP resources) is selected from one or more defined BWPs (e.g., legacy uplink and downlink BWPs) for full duplex operation. In accordance with some embodiments, the usable bandwidth selected for a full duplex frequency-based BWP configuration can be segmented (e.g., one or more segments which are disjoint in frequency). When operating in a full duplex slot, symbol, or other epoch, a communication device may operate in the usable bandwidth of a full duplex frequency-based BWP configuration corresponding to active uplink and downlink defined BWPs.

Figure 6B:
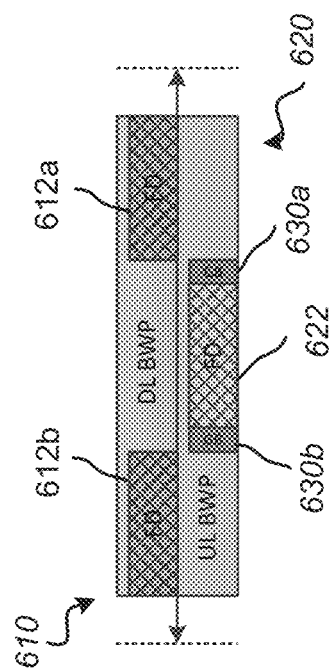
FIGS. 6A and 6B show examples of usable bandwidth for full duplex operation selected from defined downlink and uplink BWPs according to some aspects of the present disclosure.
Figure 6A:
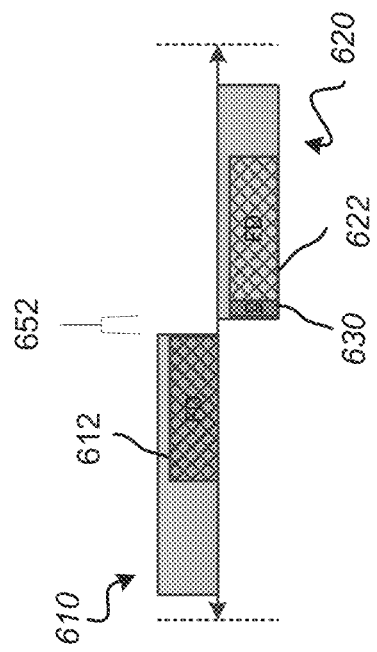

FIGS. 6A and 6B show examples of usable bandwidth for full duplex operation selected from defined downlink and uplink BWPs. In the example of FIG. 6A, the defined downlink half duplex and uplink half duplex BWPs are overlapping in frequency and the usable bandwidth for a full duplex frequency-based BWP configuration is selected as non-overlapping subsets of bandwidth of the defined downlink and uplink BWPs. In the example of FIG. 6B, the defined downlink and uplink BWPs are non-overlapping in frequency and the usable bandwidth for a full duplex frequency-based BWP configuration is selected as subsets of bandwidth of the defined downlink and uplink BWPs, as will be discussed further below.

Referring first to the example of FIG. 6A, usable bandwidth is selected as BWP 612 in defined downlink half duplex BWP 610 (e.g., a legacy downlink BWP). As shown, BWP 612 has segments 612a and 612b. Also, usable bandwidth is selected as BWP 622 in defined uplink half duplex BWP 620 (e.g., a legacy uplink BWP). As can be seen in FIG. 6A, the bandwidths of BWP 612 and BWP 622 are selected so as to be non-overlapping in frequency.

In accordance with aspects of the present disclosure, BWPs of full duplex frequency-based BWP configurations may be variously selected subsets of corresponding defined BWPs. For example, the frequencies, bandwidth, etc. of the BWPs of a full duplex frequency-based BWP configuration may be selected as appropriate for any scenario. It should be appreciated that, although both BWP 612 and BWP 622 of the example are each bandwidth subsets of a corresponding defined half duplex BWP, the BWPs of a full duplex frequency-based BWP configuration of some embodiments may comprise the full bandwidth of a corresponding defined BWP (e.g., in a situation where the defined BWPs are partially overlapping). Generally, these approaches and other configurations may occur so long as appropriate constraints with respect to bandwidth concerns, timing alignments, and frequency locations are met (e.g., the BWPs of a full duplex frequency-based BWP configuration are non-overlapping, guard band needs are satisfied, etc.). Moreover, as shown by the example of BWP 612 in FIG. 6A, the bandwidth of a BWP of a full duplex frequency-based BWP configuration may be segmented (e.g., comprising upper frequency BWP 612a as a first segment and lower frequency BWP 612b as a second segment). The number of segments, the bandwidth of the segments, the bandwidth spacing, etc. of a particular segmented BWP may be configured based upon various aspects of the communications, such as the uplink and/or downlink data traffic, the number of communication devices engaged in the full duplex communications, guard band needs, etc. In accordance with some aspects of the disclosure, the BWPs accommodate full duplex frequency-based BWP configurations in which center frequencies of the uplink and downlink BWPs are not aligned (i.e., center frequency alignment is not provided).

Bandwidth and frequency location constraints implemented with respect to BWP configurations supporting full duplex operation of embodiments provide for defining one or more guard bands between BWPs of a full duplex frequency-based BWP configuration. As an example, guard band 630 is defined in the example of FIG. 6A to provide instances of bandwidth, disposed between the uplink and downlink BWPs of the full duplex frequency-based BWP configuration, that remain unused for uplink/downlink communications. In the example of FIG. 6A, BWP 612 for the downlink is segmented. The guard band 630 is provided to include guard band 630a and guard band 630b separating BWP 612 from BWP 622 in the frequency domain. The bandwidth of guard bands may comprise a frequency band determined to facilitate adequate isolation (e.g., uplink/downlink interference below a predetermined threshold level).

Guard band format and size may vary according to aspects of the present disclosure. In some scenarios, guard bands can be sized and/or spaced apart to enable full duplex communication using concurrent communications via an uplink BWP and a downlink BWP of a full duplex frequency-based BWP configuration. The bandwidth of a particular guard band may, for example, vary based upon attributes such as the frequencies of the corresponding uplink and downlink communications, the amount of isolation desired, the sub-carrier spacing of the uplink and downlink BWPs, the time difference between the start of uplink and downlink signals, the particular channels to be carried in the BWPs, etc. The determination of the bandwidth of guard bands 630 of embodiments may depend on the UE capabilities to suppress the self-interference from its uplink transmission to the downlink reception and on the UE uplink transmit power. In most scenarios, the measured power of the residual self-interference (i.e., after UE mitigation of the self-interference) is to be lower than a specified threshold such that the UE can perform proper downlink reception.

Referring now to the example of FIG. 6B, usable bandwidth is selected as BWP 612 in defined downlink half duplex BWP 610 (e.g., a legacy downlink BWP). Also, usable bandwidth is selected as BWP 622 in defined uplink half duplex BWP 620 (e.g., a legacy uplink BWP). As can be seen in FIG. 6A, the bandwidths of defined downlink half duplex BWP 610 and defined uplink half duplex BWP 620 are non-overlapping, however BWPs 612 and 622 of the full duplex frequency-based BWP configuration are selected subsets of the corresponding defined half duplex BWPs. For example, the usable bandwidth of the full duplex frequency-based BWP configuration may be configured to satisfy guard band needs using a bandwidth subset of either or both of the defined half duplex BWPs. In the example of FIG. 6B, although gap 652 is present between the bandwidth of defined downlink half duplex BWP 610 and the bandwidth of defined uplink half duplex BWP 602, gap 652 may comprise insufficient bandwidth for use as a guard band. Accordingly, BWP 622 in defined uplink half duplex BWP 620 may be selected as a subset of the defined BWP bandwidth to provide guard band 630 which combined with gap 652 satisfies one or more guard band need.

In accordance with aspects of the present disclosure, the BWPs of a full duplex frequency-based BWP configuration may be as large as the defined BWPs (e.g., legacy downlink and uplink BWPs), or may be some sub-portion thereof. Such subletting of the BWPs of a full duplex frequency-based BWP configuration facilitates fast adaptation between legacy TDD slots and FD slots of embodiments, where minimal impact to RF retuning and baseband processing is needed.

Figure 7:
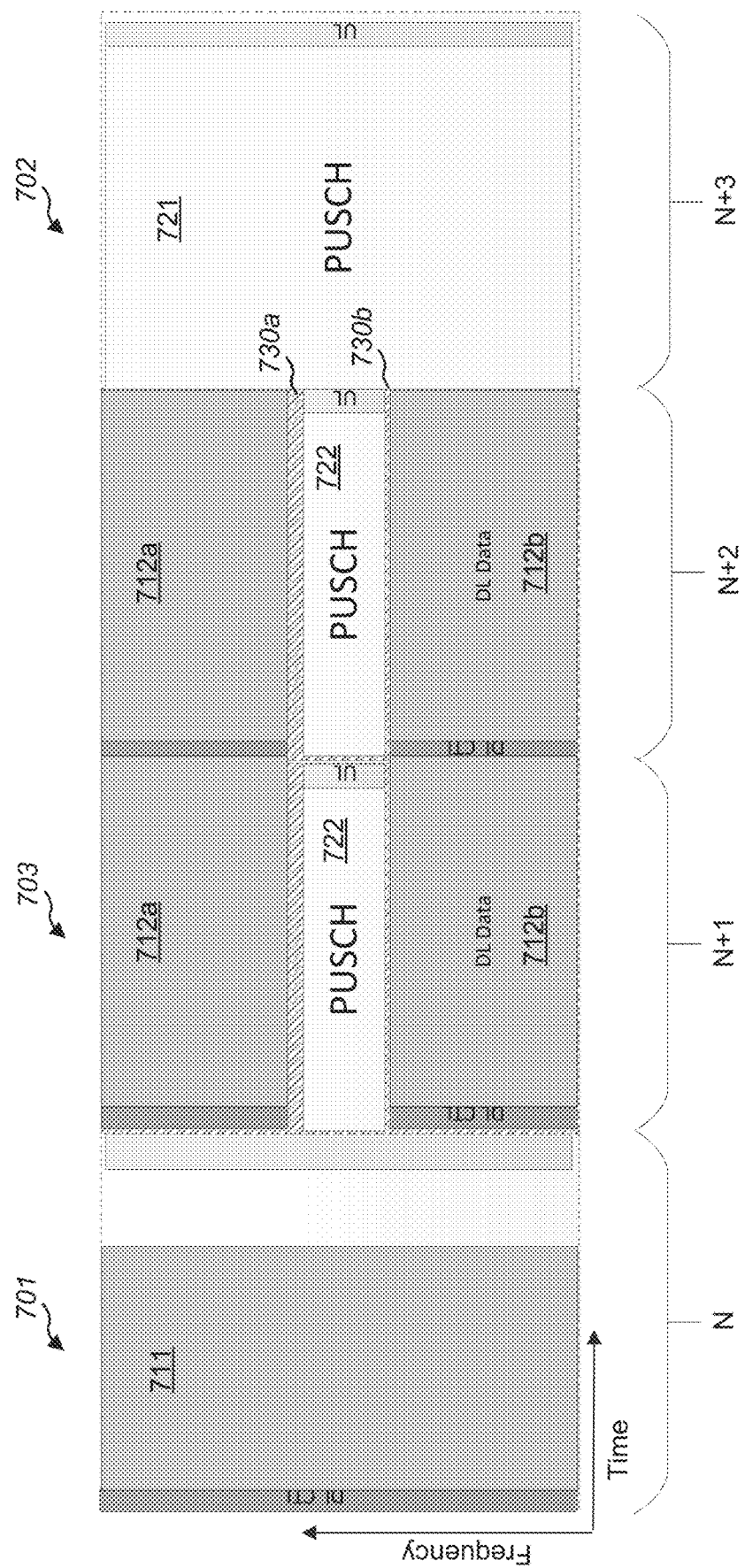
FIG. 7 illustrates example full duplex operation implementing a full duplex frequency-based BWP configuration according to some aspects of the present disclosure.

FIG. 7 illustrates an example in which a full duplex frequency-based BWP configuration in accordance with concepts of the present disclosure is implemented via full duplex operation. In particular, FIG. 7 shows the use of various different BWP configurations (shown as BWP configurations 701, 702, and 703) over time (shown as time slots N, N+1, N+2, and N+3). Although the example of FIG. 7 illustrates a time aspect as comprising time slots (e.g., communication frame time slots), a time aspect of the BWP configurations of embodiments herein may comprise any suitable epoch (e.g., slot, symbol, etc.).

BWP configuration 701 comprises half duplex frequency-based BWP 711 including full bandwidth of a corresponding defined BWP. In some scenarios, legacy downlink BWP configuration parameters of an active downlink BWP may be defined. As shown, in some examples, defined BWPs may be for a component carrier being allocated for half duplex downlink communication at slot N. Similarly, BWP configuration 702 of the example of FIG. 7 comprises half duplex frequency-based BWP 721 including the full bandwidth of a corresponding defined BWP (e.g., legacy uplink BWP configuration parameters of an active downlink BWP) for a component carrier being allocated for half duplex uplink communication at slot N+3.

In contrast, BWP configuration 703 comprises a full duplex frequency-based BWP configuration including BWP 712 and BWP 722 (e.g., as may correspond to the example of FIG. 6A). BWP 712 of the example in FIG. 7 includes a subset of the corresponding defined BWP (e.g., subset of the frequency resources of the active downlink half duplex BWP) for a component carrier being allocated for downlink communication of full duplex communications at slots N+1 and N+2. Correspondingly, BWP 722 includes a subset of the corresponding defined BWP (e.g., subset of the frequency resources of the active uplink BWP) for a component carrier being allocated for uplink communications of full duplex communications at slots N+1 and N+2. Using constraints with respect to the bandwidth and frequency location implemented in BWP 712 and BWP 722 of half duplex BWP configuration 730, non-overlapping portions of BWP frequency resources are defined for supporting full duplex operation in which downlink and uplink transmissions overlap in time (e.g., simultaneous downlink and uplink transmissions).

As shown in the example of FIG. 7, a wireless device using full duplex frequency-based BWP configurations of embodiments may transition between full duplex operation and half duplex operation. Transitions may be based on a duplexing nature of a respective slot or symbol. Transition of resources can occur using different resources of the active uplink and/or downlink defined BWPs. A wireless device may additionally or alternatively transition between full duplex operation according to a first full duplex frequency-based BWP configuration and a second full duplex frequency-based BWP configuration. BWP configurations can correspond to active uplink and downlink defined BWPs (e.g., where a plurality of uplink and downlink BWP pair sets, each including usable bandwidth selected from the active uplink and downlink defined BWPs for full duplex operation). Such intra defined BWP transitions avoids the BWP switching time which is often greater than 1 ms. That is, transitioning between full duplex operation and half duplex operation, as well as transitioning between different configurations of full duplex operation, may be accomplished with switching times of less than 1 ms according to some embodiments of the present disclosure.

In accordance with aspects of the present disclosure, sets of uplink and downlink BWP pairs (e.g., BWP pairs for different full duplex frequency-based BWP configurations) may be provided to support various communication modes. For example, a first uplink and downlink BWP pair set may comprise BWP 712 and BWP 722 providing the full duplex frequency-based BWP configuration of BWP configuration 703 shown in FIG. 7 supporting full duplex operation. A second uplink and downlink BWP set may comprise different selected BWPs (e.g., the BWPs of FIG. 6B, different BWPs selected from defined downlink BWP 610 and defined uplink BWP 620 of FIG. 6A, etc.) providing a different full duplex frequency-based BWP configuration also supporting full duplex operation. In accordance with embodiments, a plurality of uplink and downlink BWP pair sets providing full duplex frequency-based BWP configurations are configured to satisfy frequency domain aspects (e.g., bandwidth and frequency) for full duplex operation. Other uplink and downlink BWP pair sets may, however, be configured for half duplex operation. For example, a third uplink and downlink BWP set may comprise a BWP including the full bandwidth of a corresponding defined BWP (e.g., half duplex frequency-based BWP 711 or BWP 712 of FIG. 7) while the other BWP of the set provides a null bandwidth. Accordingly, sets of uplink and downlink BWP pairs may be provided for various combinations of full duplex and/or half duplex operation.

Figure 8:
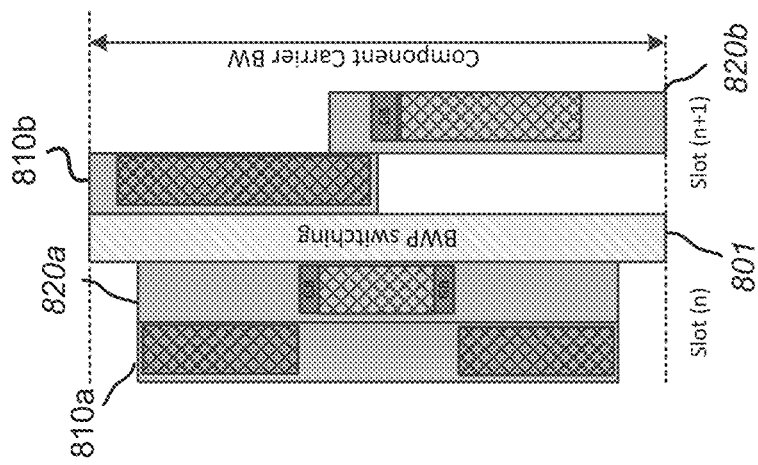
FIGS. 8 and 9 illustrate sets of uplink and downlink BWP pairs provided with respect to different defined downlink and uplink BWPs according to some aspects of the present disclosure.

A plurality of sets of uplink and downlink BWP pairs may be provided with respect to different defined downlink and uplink BWPs. For example, a first set of uplink and downlink BWP pairs may be provided for first active defined downlink and uplink BWPs (e.g., active downlink BWP 810a and active uplink BWP 820a of FIG. 8) while a second set of uplink and downlink BWP pairs may be provided for second active defined downlink and uplink BWPs (e.g., active downlink BWP 810b and active uplink BWP 820b of FIG. 8). Embodiments may utilize BWP switching methodology (e.g., BWP switching 801 of FIG. 8) in switching between the different sets of uplink and downlink BWP pairs, such as to switch between half duplex and full duplex operation or even to switch between different configurations of full duplex operation.

Figure 9:
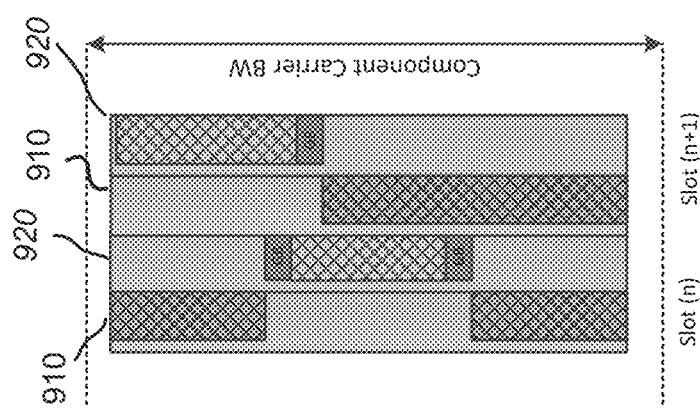

Additionally or alternatively, a plurality of sets of uplink and downlink BWP pairs may be provided with respect to a particular defined downlink and uplink BWPs. For example, a first set of uplink and downlink BWP pairs and a second set of uplink and downlink BWP pairs may be provided for a defined downlink and uplink BWPs (e.g., active downlink BWP 910 and active uplink BWP 920 of FIG. 9). Implicit BWP switching based on the duplexing nature of the time slots and/or symbols may be utilized in switching between half duplex and full duplex operation or even in switching between different configurations of full duplex operation using the different sets of uplink and downlink BWP pairs of the active defined downlink and uplink BWPs. FIG. 9, for example, illustrates implicit BWP switching between different full duplex frequency-based BWP configurations for switching between different configurations of full duplex operation.

As should be understood from the foregoing, various options for determining the BWP to switch to for implicit BWP switch may be provided. For example, multiple sets of uplink and downlink BWP pairs for active BWPs may be defined for different duplexing modes (e.g., one or more sets of uplink and downlink BWP pairs for half duplex slots, one or more sets of uplink and downlink BWP pairs for full duplex slots, etc.). When transitioning between half duplex and full duplex slots, or when transitioning between full duplex slots having different uplink/downlink configurations, the active BWP implicitly changes to the corresponding set of uplink and downlink BWP pairs. As another example, active uplink and downlink BWP pairs may be expanded from a set of downlink and uplink half duplex frequency-based BWPs (e.g., {DL, UL}) to a set also including a downlink half duplex frequency-based BWP and an uplink half duplex frequency-based BWP (e.g., {DL-HD, UL-HD, DL-FD, UL-FD}). In this example, additionally and/or alternatively, an associated active downlink and uplink BWP supporting full duplex operation may be used when transitioning to a full duplex slot or symbol.

Implicit BWP switching provided according to embodiments of the disclosure facilitates a relaxation of (i.e. faster) BWP switching delay, and thus may be utilized to improve the switch latency. Moreover, BWP configurations can be configured to support disjoint frequency ranges within a BWP, an excluded frequency range within the BWP for full duplex operation, etc.

Figure 10A:
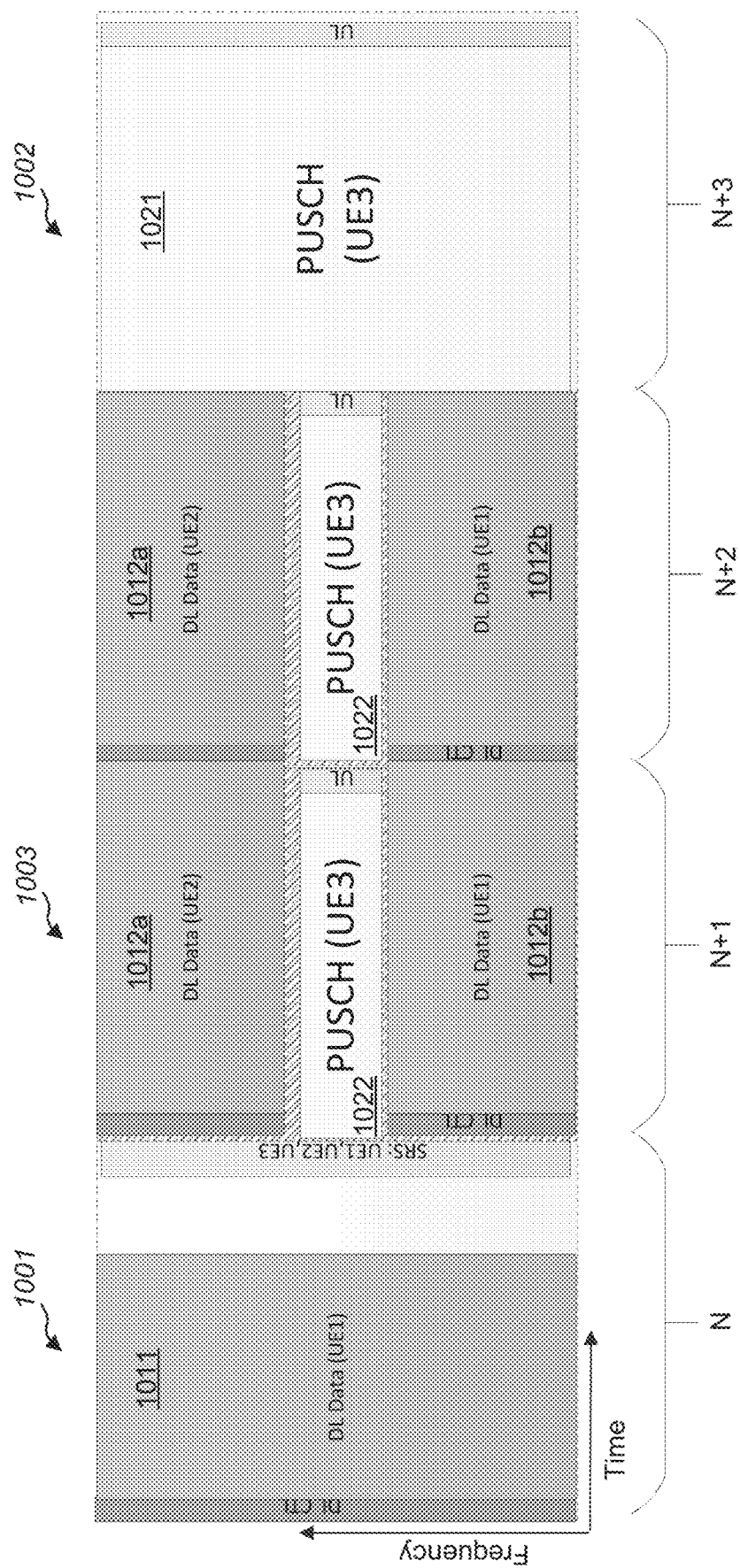
FIGS. 10A and 10B illustrate examples in which BWP portions of a full duplex frequency-based BWP configuration are allocated to multiple UEs according to some aspects of the present disclosure.

FIG. 10A illustrates an example in which BWP portions of a full duplex frequency-based BWP configuration are allocated to multiple UEs. In the example of FIG. 10A, a full duplex frequency-based BWP configuration is used with respect to wireless devices operating in a combination of full duplex and half duplex operation. For example, a base station may operate in full duplex mode while some or all of the UEs are only half duplex capable. The base station (or network node) can adjust and/or tailor its operations in light of UE capabilities. FIG. 10A shows the use of various different BWP configurations (shown as BWP configurations 1001, 1002, and 1003) over time (shown as time slots N, N+1, N+2, and N+3) where the base station operates in full duplex mode while serving three UEs (UE1, UE2, and UE3) operating in half duplex mode.

Each of the illustrated BWP configurations (1001, 1002, and 1003) have a number of formats and features. As one example, BWP configuration 1001 comprises half duplex frequency-based BWP 1011. As illustrated, BWP configuration 1001 includes the full bandwidth of a corresponding defined BWP for a component carrier, and thus may be allocated to one or more UEs for half duplex downlink communication at slot N. Similarly, BWP configuration 1002 of the example of FIG. 10A comprises half duplex frequency-based BWP 1021. BWP configuration 1002 may include the full bandwidth of a corresponding defined BWP for a component carrier, and thus may be allocated to one or more UEs for half duplex uplink communication at slot N+3. BWP configuration 1003, however, comprises a full duplex frequency-based BWP configuration including BWP 1012 and BWP 1022. The BWPs of BWP configuration 1003 may be allocated to different ones of the UEs for their use in half duplex communication at slots N+1 and N+2. BWP configuration 1003 includes both uplink and downlink BWPs (uplink BWP 1022 and downlink BWP 1012), and thus the base station may operate in a full duplex mode despite the individual UEs operating in half duplex mode.

In the illustrated example of BWP configuration 1003, BWP 1022 includes a subset of the corresponding defined BWP (e.g., subset of the frequency resources of the active uplink BWP) for a component carrier being allocated to UE3 for uplink communications. Further, in the illustrated example of BWP configuration 1003, BWP 1021 includes a subset of the corresponding defined BWP (e.g., subset of the frequency resources of the active downlink BWP) for a component carrier being allocated for downlink communication. In this example, the bandwidth of BWP 1021 is segmented. A first segment comprising upper frequency BWP 1012a is allocated to UE2 for downlink communications and a second segment comprising lower frequency BWP 1012b is allocated to UE1 for downlink communications. Accordingly, BWP portions of the full duplex frequency-based BWP configuration of BWP configuration 1003 are allocated to different UEs, including portions for different link directions (e.g., uplink/downlink) being allocated to different UEs and portions for a same link direction (e.g., downlink, as shown, or uplink) being allocated to different UEs.

Although the example of FIG. 10A is described with reference to BWP 1021 being segmented as upper frequency BWP 1012a and lower frequency BWP 1012b, multiple independent BWPs having disjoint frequency bands may be provided according to some embodiments. Moreover, a BWP need not be segmented, or multiple independent BWPs need not be provided, in order to support allocation of portions of the full duplex frequency-based BWP configuration to different UEs for a same link direction. That is, portions within a contiguous bandwidth of a half duplex frequency-based BWP may be allocated to different UEs, or other wireless communication devices in some implementations.

Continuing with the example of FIG. 10A, it can be seen that changing the slot/symbol format from half duplex to full duplex, or vice versa, may have an effect on the BWP of the half duplex UE. In accordance with some aspects, the UEs may be configured using slot configurations (e.g., a selected slot configuration from a set of different predefined half-duplex slot configurations {HD1, HD2, HD3, . . . }, or the UEs may be dynamically signaled with respect to slot/symbol format changes. UE communication operation may, for example, be defined with BWP sets that include UL/DL BWP configurations corresponding to the different HD slots configuration. In the example of FIG. 10A, the communication operation with respect to UE1, UE2, and UE3 may be configured as follows:

UE1={DL-HD1=100 MHz, UL-HD1=100 Mhz, DL-HD2=40 MHz lower, UL-HD2=Null, . . . }

UE2={DL-HD1=Null, UL-HD1=100 Mhz, DL-HD2=40 MHz upper, UL-HD2=Null, . . . }

UE3={DL-HD1=Null, UL-HD1=100 Mhz, DL-HD2=null, UL-HD2=20 MH center, . . . }

When there is a transition between HD1 and HD2 slots, the UE may change the active BWP implicitly to UL-HD2 and DL-HD2 within the BWP set.

Figure 10B:
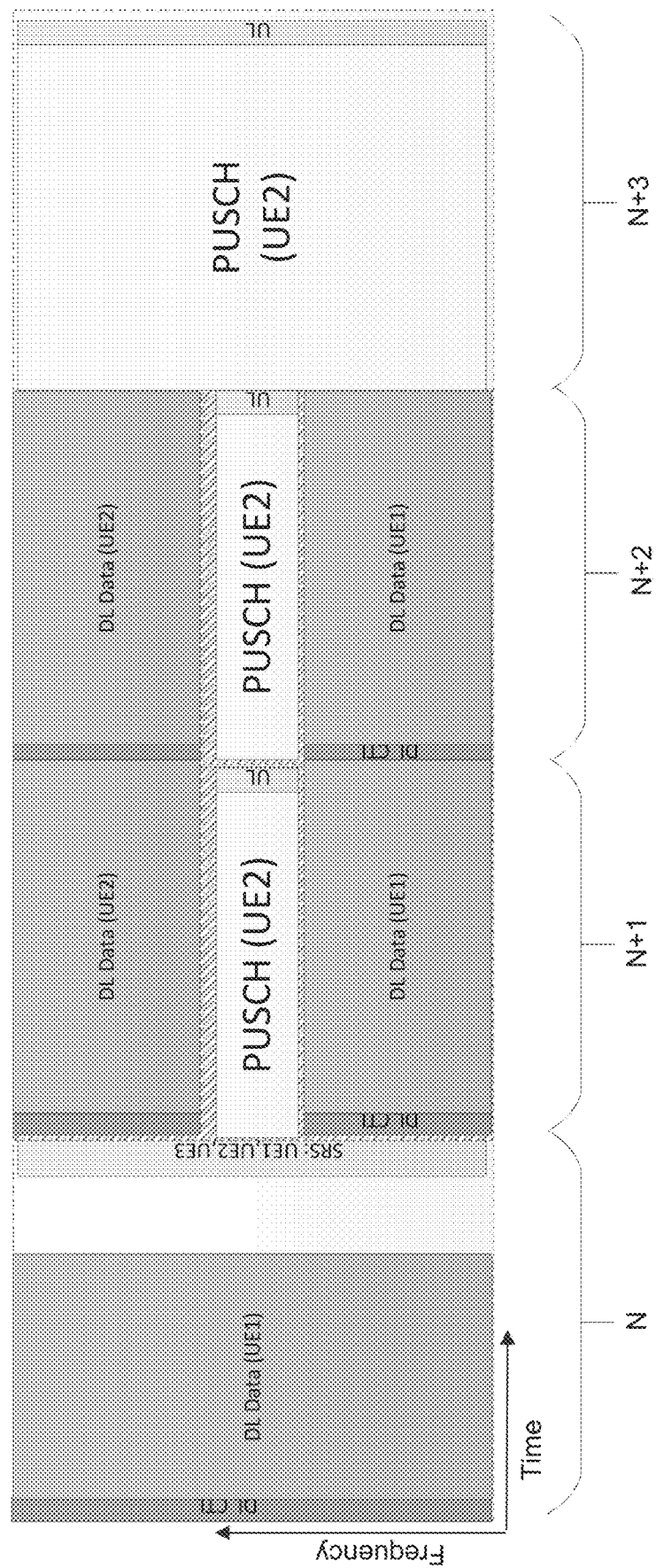

FIG. 10B illustrates another example in which BWP portions of a full duplex frequency-based BWP configuration are allocated to multiple UEs. In the example of FIG. 10B, a full duplex frequency-based BWP configuration is used with respect to UEs operating in a combination of full duplex and half duplex operation. For example, in addition to a base station operating in full duplex mode, a full duplex capable UE (shown as UE2 in time slots N+1 and N+2) is operating in full duplex mode. A UE that is only half duplex capable (shown as UE1 in time slots N, N+1, and N+2) is operating in half duplex mode, as does the full duplex capable UE when operating with respect to a half duplex BWP configuration (shown as UE2 in time slot N+3), in the illustrated example.

In some aspects of the disclosure, a half duplex BWP configuration (e.g., legacy downlink and/or uplink BWPs of a defined BWP) may be designated as a default BWP configuration to be used by wireless devices of wireless network 100. For example, a BWP timer (e.g., inactivity timer) may be utilized with respect to BWP configuration assignments such that, when the BWP timer expires, a UE may default to operation in half duplex mode. If a slot/symbol is full duplex (e.g., implementing a full duplex frequency-based BWP configuration), a UE operating in defaulted half duplex mode may assume that the slot/symbol is a half duplex slot/symbol, or skip the slot. Transition from current active BWP to a default BWP may follow various procedures. For example, if the current active BWP configuration is in full duplex, a wireless device may transition the current active BWP configuration to half duplex, and thereafter the wireless device may transition to the default BWP configuration in half duplex. In another example, if the current active BWP configuration is in full duplex, a wireless device may transition the current active BWP configuration to the default BWP in full duplex, and thereafter the wireless device may transition to the default BWP configuration in half duplex. In the foregoing examples, separate or same inactivity timer values for a BWP timer may be utilized for the transition steps. In yet another example, if the current active BWP configuration is in full duplex, a wireless device may transition the current active BWP configuration to the default BWP configuration in half duplex.

Figures 11, 12:
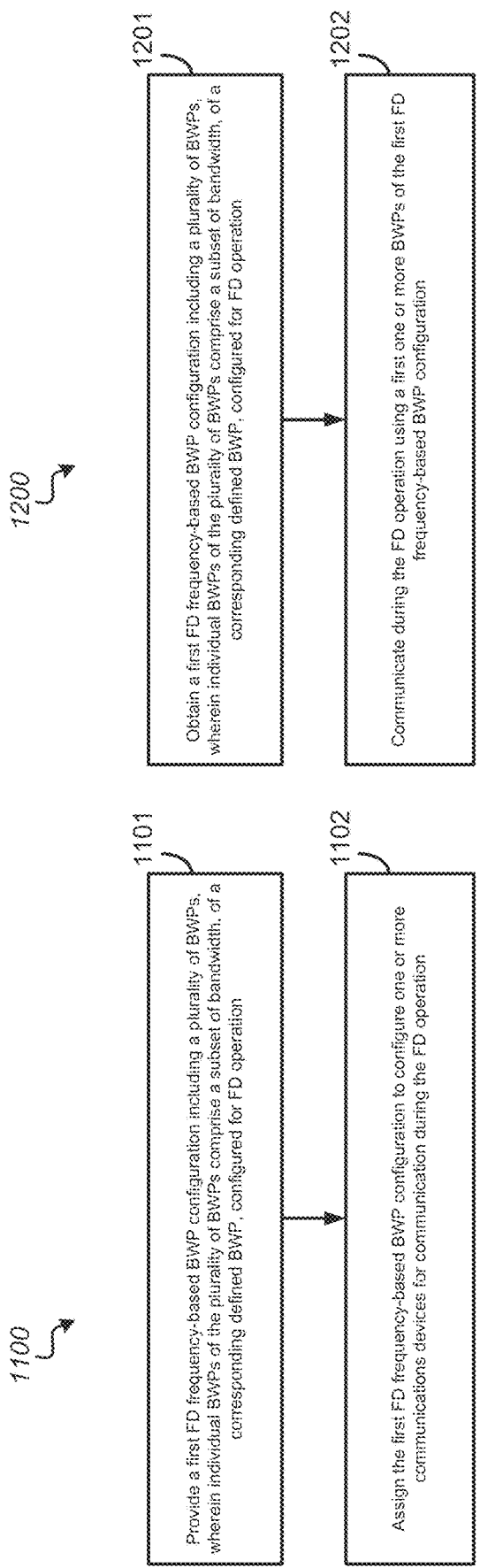
FIG. 11 is a block diagram illustrating example blocks executed by a wireless communication device, such as a base station, according to some aspects of the present disclosure.
FIG. 12 is a block diagram illustrating example blocks executed by a wireless communication device, such as a UE, according to some aspects of the present disclosure.
Figure 13:
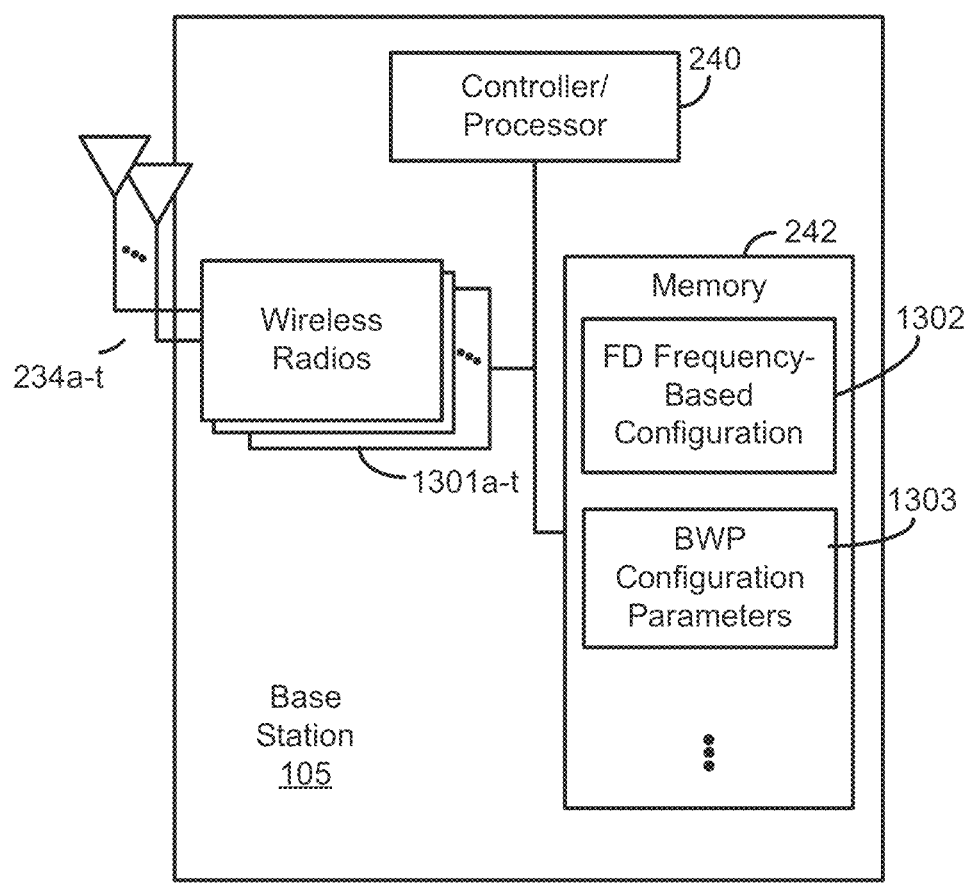
FIG. 13 is a block diagram conceptually illustrating a design of a base station configured for implementing a full duplex frequency-based BWP configuration according to some aspects of the present disclosure.

FIG. 11 is a block diagram illustrating example blocks executed by a wireless communication device, such as base station 105, to implement aspects of the present disclosure. The example blocks will also be described with respect to base station 105 as illustrated in FIG. 13. FIG. 13 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1300a-t and antennas 234a-t. Wireless radios 1300a-t include various components and hardware, as illustrated in FIG. 2 for base station 105, including modulator/demodulators 232a-t, MIMO detector 236, receive processor 238, transmit processor 220, and TX MIMO processor 230.

In the example operation of flow 1100 of FIG. 11, base station 105 provides a first full duplex frequency-based BWP configuration. For example, FD frequency-based configuration logic 1302 shown in FIG. 13 may provide selection of usable bandwidth (e.g., subsets of BWP resources) from one or more defined BWPs (e.g., legacy uplink and downlink half duplex BWPs defined by respective sets of BWP configuration parameters of BWP configuration parameters 1303) to define the first FD frequency-based BWP configuration for full duplex operation, at block 1101. The first FD frequency-based BWP configuration may include a plurality of BWPs. Individual BWPs of the plurality of BWPs may comprise a subset of bandwidth, of a corresponding defined BWP, configured for full duplex operation (e.g., a subset of bandwidth of the defined BWP that is usable for full duplex operation selected as non-overlapping subsets of bandwidth of the defined downlink and uplink BWPs). One or more sets of BWP configuration parameters defining the first full duplex frequency-based BWP configuration and/or individual BWPs thereof may be stored as BWP configuration parameters of BWP configuration parameters 1303.

At block 1102 of flow 1100, base station 105 assigns the first full duplex frequency-based BWP configuration to configure one or more communications devices for communication during the full duplex operation. For example, scheduler 244 of base station 105 may allocate some or all of the individual BWPs of the first full duplex frequency-based BWP configuration to one or more UE of UEs 115. The full duplex operation may, for example, provide for base station 105 operating in a full duplex mode while one or more UEs are operating in a half duplex mode (e.g., as shown in FIG. 4A), base station 105 and a UE each operating in a full duplex mode (e.g., as shown in FIG. 4B), a UE operating in a full duplex mode with one or more base stations of base stations 105, etc.

Figure 14:
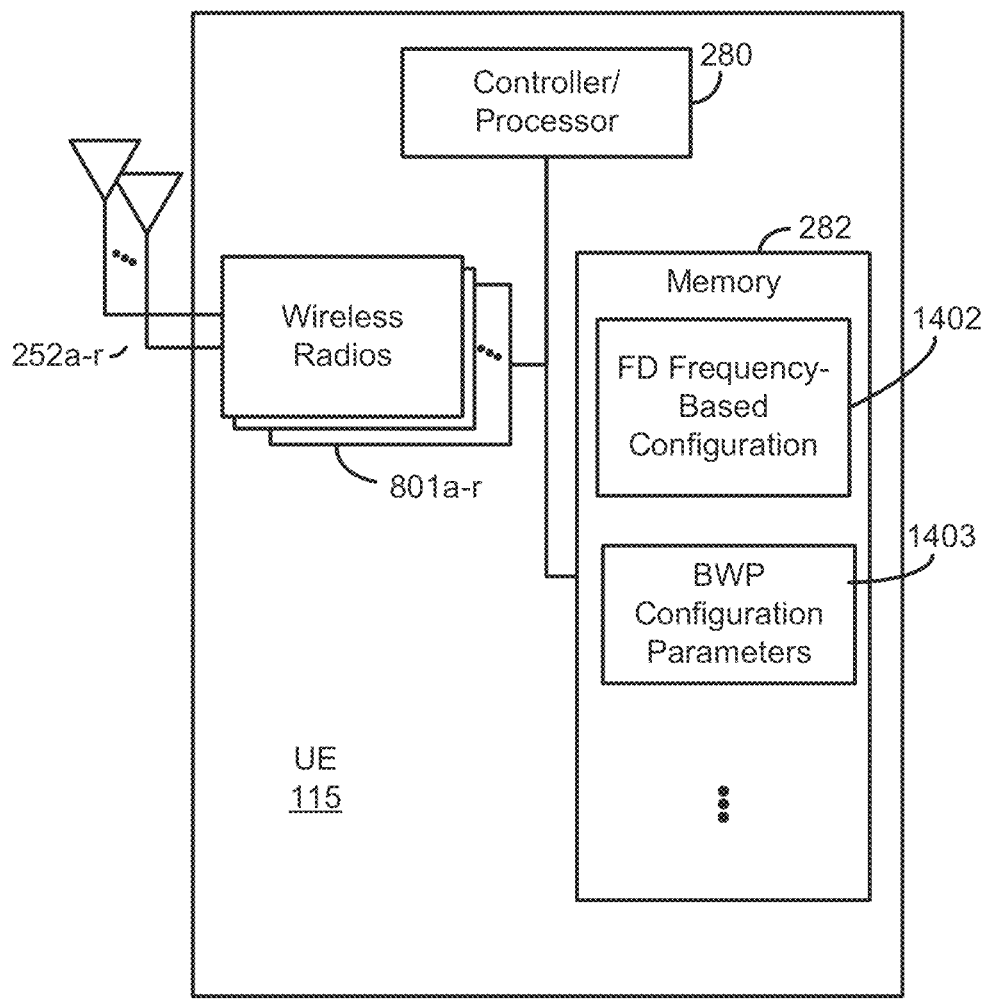
FIG. 14 is a block diagram conceptually illustrating a design of a UE configured for implementing a full duplex frequency-based BWP configuration according to some aspects of the present disclosure.

FIG. 12 is a block diagram illustrating example blocks executed by a wireless communication device, such as UE 115, to implement aspects of the present disclosure. The example blocks will also be described with respect to UE 115 as illustrated in FIG. 14. FIG. 14 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1400*a-r* and antennas 252*a-r*. Wireless radios 1400*a-r* include various components and hardware, as illustrated in FIG. 2 for UE 115, including modulator/demodulators 254*a-r*, MIMO detector 256, receive processor 258, transmit processor 264, and TX MIMO processor 266.

In the example operation of block 1201 of flow 1200 of FIG. 12, UE 115 obtains a first full duplex frequency-based BWP. For example, FD frequency-based configuration logic 1302 of UE 115 may be configured for various BWP configurations via DCI provided by base station 105. The DCI may include BWP configuration parameters for one or more BWP configuration, identify a BWP configuration (e.g., stored in BWP configuration parameters 1303), etc., as may be used by FD frequency-based configuration logic 1302 to configure UE 115 for communication during full duplex operation. The first full duplex frequency-based BWP configuration may include a plurality of BWPs. Individual BWPs of the plurality of BWPs may comprise a subset of bandwidth, of a corresponding defined BWP (e.g., legacy uplink and downlink half duplex BWPs defined by respective sets of BWP configuration parameters of BWP configuration parameters 1403), configured for full duplex operation (e.g., a subset of bandwidth of the defined BWP that is usable for full duplex operation selected as non-overlapping subsets of bandwidth of the defined downlink and uplink BWPs). One or more sets of BWP configuration parameters defining the first full duplex frequency-based BWP configuration and/or individual BWPs thereof may be stored as BWP configuration parameters of BWP configuration parameters 1403.

At block 1202 of 1200, UE 115 communicates during the full duplex operation using a first one or more BWPs of the first full duplex frequency-based BWP configuration. For example, FD frequency-based configuration logic 1402 may configure UE 115 to communicate with a base station using one or more individual BWP of the first full duplex frequency-based BWP, such as during full duplex operation. The full duplex operation may, for example, provide for a base station operating in a full duplex mode while UE 115 is operating in a half duplex mode (e.g., as shown in FIG. 4A), a base station and UE 115 each operating in a full duplex mode (e.g., as shown in FIG. 4B), UE 115 operating in a full duplex mode with one or more base stations, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to implementing a full duplex frequency-based BWP configuration may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 11 and 12) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   providing a first full duplex (FD) frequency-based bandwidth part (BWP) configuration including a plurality of BWPs, wherein the plurality of BWPs of the first FD frequency-based BWP configuration are configured for FD operation and include a first BWP comprising first bandwidth selected from a first defined BWP of a plurality of defined BWPs and a second BWP comprising second bandwidth selected from bandwidth of a second defined BWP of the plurality of defined BWPs, and wherein one or more BWPs of the plurality of BWPs of the first FD frequency-based BWP configuration comprise a sub-portion of bandwidth of a corresponding defined BWP of the plurality of defined BWPs; and
   assigning the first FD frequency-based BWP configuration to configure one or more communications devices for communication during the FD operation.

2. The method of claim 1, wherein at least one of the first or second BWPs of the first FD frequency-based BWP configuration provides a segmented BWP configuration having non-contiguous bandwidth portions.

3. The method of claim 1, wherein the first defined BWP of the plurality of defined BWPs comprises a downlink half duplex (HD) BWP of the plurality of defined BWPs and the second defined BWP of the plurality of defined BWPs comprises an uplink HD BWP of the plurality of defined BWPs, wherein the first bandwidth of the first BWP of the first FD frequency-based BWP configuration and the second bandwidth of the second BWP of the first FD frequency-based BWP configuration are non-overlapping in frequency, and wherein the assigning the first FD frequency-based BWP configuration for FD wireless communication comprises:
   assigning the first BWP of the first FD frequency-based BWP configuration for a downlink of the FD wireless communication; and
   assigning the second BWP of the first FD frequency-based BWP configuration for an uplink of the FD wireless communication.

4. The method of claim 3, wherein the downlink HD BWP of the plurality of defined BWPs and the uplink HD BWP of the plurality of defined BWPs are at least partially overlapping in frequency, wherein the first bandwidth of the first BWP of the first FD frequency-based BWP configuration and the second bandwidth of the second BWP of the first FD frequency-based BWP configuration are non-overlapping portions of the downlink HD BWP and the uplink HD BWP of the plurality of defined BWPs.

5. The method of claim 3, wherein the downlink HD BWP of the plurality of defined BWPs and the uplink HD BWP of the plurality of defined BWPs are non-overlapping in frequency, wherein the first bandwidth of the first BWP of the first FD frequency-based BWP configuration and the second bandwidth of the second BWP of the first FD frequency-based BWP configuration are non-overlapping portions of the downlink HD BWP and the uplink HD BWP of the plurality of defined BWPs separated by a guard band defined at least in part by the sub-portion of bandwidth of one of the downlink HD BWP or the uplink HD BWP.

6. The method of claim 1, further comprising:
   providing a plurality of uplink and downlink BWP pair sets each including a plurality of BWPs, wherein the first FD frequency-based BWP configuration is an uplink and downlink BWP pair set of the plurality of uplink and downlink BWP pair sets.

7. The method of claim 6, wherein two or more uplink and downlink BWP pair sets of the plurality of uplink and downlink BWP pair sets are defined for bandwidth of a downlink half duplex (HD) BWP of the plurality of defined BWPs and bandwidth of an uplink HD BWP of the plurality of defined BWPs.

8. The method of claim 7, wherein the two or more uplink and downlink BWP pair sets defined for the bandwidth of the downlink HD BWP and the uplink HD BWP of the plurality of defined BWPs include a first uplink and downlink BWP pair set of the first FD frequency-based BWP configuration configured to support FD operation and a second uplink and downlink BWP pair set configured to support HD operation.

9. The method of claim 7, wherein the two or more uplink and downlink BWP pair sets defined for the bandwidth of the downlink HD BWP and the uplink HD BWP of the plurality of defined BWPs expand the downlink HD BWP to at least a first BWP configuration configured to support FD operation and a second BWP configuration configured to support HD operation and expand the uplink HD BWP to at least a third BWP configuration configured to support FD operation and a fourth BWP configuration configured to support HD operation.

10. The method of claim 1, wherein the assigning the first FD frequency-based BWP configuration assigns a first BWP configuration of the first FD frequency-based BWP configuration to a communication device for communication of FD slots or symbols, the method further comprising:
    assigning a second BWP configuration to the communication device for communication of half duplex (HD) slots or symbols, wherein transitioning between FD operation and HD operation is based on a duplexing nature of a respective slot or symbol.

11. The method of claim 1, wherein the assigning the first FD frequency-based BWP configuration assigns a first portion of a first BWP configuration of the first FD frequency-based BWP configuration to a first half duplex (HD) mode communication device communicating with a FD mode communication device, a second portion of the first BWP configuration of the first FD frequency-based BWP configuration to a second HD mode communication device communicating with the FD mode communication device, and at least a portion of a second BWP configuration of the first FD frequency-based BWP configuration to a third HD mode communication device communicating with the FD mode communication device.

12. The method of claim 1, wherein the assigning the first FD frequency-based BWP configuration assigns a first portion of a first BWP configuration of the first FD frequency-based BWP configuration to a first half duplex (HD) mode communication device communicating with a FD mode communication device, a second portion of the first BWP configuration of the first FD frequency-based BWP configuration to a first FD mode communication device communicating with the FD mode communication device, and at least a portion of a second BWP configuration of the first FD frequency-based BWP configuration to the first FD mode communication device.

13. A method of wireless communication comprising:
obtaining a first full duplex (FD) frequency-based bandwidth part (BWP) configuration including a plurality of BWPs, wherein the plurality of BWPs of the first FD frequency-based BWP configuration are configured for FD operation and include a first BWP comprising first bandwidth selected from a first defined BWP of a plurality of defined BWPs and a second BWP comprising second bandwidth selected from bandwidth of a second defined BWP of the plurality of defined BWPs, and wherein one or more BWPs of the plurality of BWPs of the first FD frequency-based BWP configuration comprise a sub-portion of bandwidth of a corresponding defined BWP of the plurality of defined BWPs; and
communicating during the FD operation using a first one or more BWPs of the plurality of BWPs of the first FD frequency-based BWP configuration.

14. The method of claim 13, wherein at least one of the first or second BWPs of the first FD frequency-based BWP configuration comprises a segmented BWP configuration having non-contiguous bandwidth portions.

15. The method of claim 13, wherein the first defined BWP of the plurality of defined BWPs comprises a downlink half duplex (HD) BWP of the plurality of defined BWPs and the second defined BWP of the plurality of defined BWPs comprises an uplink HD BWP of the plurality of defined BWPs, and wherein the first bandwidth of the first BWP of the first FD frequency-based BWP configuration and the second bandwidth of the second BWP of the first FD frequency-based BWP configuration are non-overlapping in frequency.

16. The method of claim 15, wherein the downlink HD BWP of the plurality of defined BWPs and the uplink HD BWP of the plurality of defined BWPs are at least partially overlapping in frequency, wherein the first bandwidth of the first BWP of the first FD frequency-based BWP configuration and the second bandwidth of the second BWP of the first FD frequency-based BWP configuration are non-overlapping portions of the downlink HD BWP and the uplink HD BWP of the plurality of defined BWPs.

17. The method of claim 15, wherein the downlink HD BWP of the plurality of defined BWPs and the uplink HD BWP of the plurality of defined BWPs are non-overlapping in frequency, wherein the first bandwidth of the first BWP of the first FD frequency-based BWP configuration and the second bandwidth of the second BWP of the first FD frequency-based BWP configuration are non-overlapping portions of the downlink HD BWP and the uplink HD BWP of the plurality of defined BWPs separated by a guard band defined at least in part by the sub-portion of bandwidth of one of the downlink HD BWP or the uplink HD BWP.

18. The method of claim 13, wherein the first FD frequency-based BWP configuration is an uplink and downlink BWP pair set of a plurality of uplink and downlink BWP pair sets including a plurality of BWPs.

19. The method of claim 18, wherein two or more uplink and downlink BWP pair sets are defined for bandwidth of a downlink half duplex (HD) BWP and an uplink HD BWP of the plurality of defined BWPs and include a first uplink and downlink BWP pair set of the first FD frequency-based BWP configuration configured to support FD operation and a second uplink and downlink BWP pair set configured to support HD operation.

20. The method of claim 18, wherein two or more uplink and downlink BWP pair sets are defined for bandwidth of a downlink half duplex (HD) BWP and an uplink HD BWP of the plurality of defined BWPs and expand the downlink HD BWP to at least a first BWP configuration configured to support FD operation and a second BWP configuration configured to support HD operation and expand the uplink HD BWP to at least a third BWP configuration configured to support FD operation and a fourth BWP configuration configured to support HD operation.

21. The method of claim 13, wherein the communicating during FD wireless communication operation using the first FD frequency-based BWP configuration is for communication of FD slots or symbols, the method further comprising:
communicating during half duplex (HD) operation using a second one or more BWPs of a second BWP configuration for communication of HD slots or symbols, wherein transitioning between FD operation and HD operation is based on a duplexing nature of a respective slot or symbol.

22. The method of claim 13, further comprising:
defaulting to a half duplex (HD) BWP configuration of the plurality of defined BWPs upon expiration of a BWP inactivity timer.

23. An apparatus configured for wireless communication, the apparatus comprising:
a memory; and
at least one processor coupled to the memory, wherein the at least one processor is configured:
to provide a first full duplex (FD) frequency-based bandwidth part (BWP) configuration including a plurality of BWPs, wherein the plurality of BWPs of the first FD frequency-based BWP configuration are configured for FD operation and include a first BWP comprising first bandwidth selected from a first defined BWP of a plurality of defined BWPs and a second BWP comprising second bandwidth selected from bandwidth of a second defined BWP of the plurality of defined BWPs, and wherein one or more BWPs of the plurality of BWPs of the first FD frequency-based BWP configuration comprise a sub-portion of bandwidth of a corresponding defined BWP of the plurality of defined BWPs; and to assign the first FD frequency-based BWP configuration to configure one or more communications devices for communication during the FD operation.

24. The apparatus of claim 23, wherein the first defined BWP of the plurality of defined BWPs comprises a downlink half duplex (HD) BWP of the plurality of defined BWPs and the second defined BWP of the plurality of defined BWPs comprises an uplink HD BWP of the plurality of defined BWPs, wherein the first bandwidth of the first BWP of the first FD frequency-based BWP configuration and the second bandwidth of the second BWP of the first FD frequency-based BWP configuration are non-overlapping in frequency, and wherein the at least one processor configured to assign the first FD frequency-based BWP configuration for FD wireless communication is configured:

to assign the first BWP of the first FD frequency-based BWP configuration for a downlink of the FD wireless communication; and to assign the second BWP of the first FD frequency-based BWP configuration for an uplink of the FD wireless communication.

25. The apparatus of claim 23, wherein the at least one processor is configured:

to provide a plurality of uplink and downlink BWP pair sets each including a plurality of BWPs, wherein the first FD frequency-based BWP configuration is an uplink and downlink BWP pair set of the plurality of uplink and downlink BWP pair sets, wherein two or more uplink and downlink BWP pair sets of the plurality of uplink and downlink BWP pair sets are defined for bandwidth of a downlink half duplex (HD) BWP of the plurality of defined BWPs and bandwidth of an uplink HD BWP of the plurality of defined BWPs, and wherein the two or more uplink and downlink BWP pair sets defined for the bandwidth of the downlink HD BWP and the uplink HD BWP of the plurality of BWPs include a first uplink and downlink BWP pair set of the first FD frequency-based BWP configuration configured to support FD operation and a second uplink and downlink BWP pair set configured to support HD operation.

26. The apparatus of claim 23, wherein the at least one processor is configured:

to provide a plurality of uplink and downlink BWP pair sets each including a plurality of BWPs, wherein the first FD frequency-based BWP configuration is an uplink and downlink BWP pair set of the plurality of uplink and downlink BWP pair sets, wherein two or more uplink and downlink BWP pair sets of the plurality of uplink and downlink BWP pair sets are defined for bandwidth of a downlink half duplex (HD) BWP of the plurality of defined BWPs and bandwidth of an uplink HD BWP of the plurality of defined BWPs, and wherein the two or more uplink and downlink BWP pair sets defined for the bandwidth of the downlink HD BWP and the uplink HD BWP of the plurality of defined BWPs expand the downlink HD BWP to at least a first BWP configuration configured to support FD operation and a second BWP configuration configured to support HD operation and expand the uplink HD BWP to at least a third BWP configuration configured to support FD operation and a fourth BWP configuration configured to support HD operation.

27. An apparatus configured for wireless communication, the apparatus comprising:

a memory; and at least one processor coupled to the memory, wherein the at least one processor is configured:

to obtain a first full duplex (FD) frequency-based bandwidth part (BWP) configuration including a plurality of BWPs, wherein the plurality of BWPs of the first FD frequency-based BWP configuration are configured for FD operation and include a first BWP comprising first bandwidth selected from a first defined BWP of a plurality of defined BWPs and a second BWP comprising second bandwidth selected from bandwidth of a second defined BWP of the plurality of defined BWPs, and wherein one or more BWPs of the plurality of BWPs of the first FD frequency-based BWP configuration comprise a sub-portion of bandwidth of a corresponding defined BWP of the plurality of defined BWPs; and to communicate during the FD operation using a first one or more BWPs of the plurality of BWPs of the first FD frequency-based BWP configuration.

28. The apparatus of claim 27, wherein the first defined BWP of the plurality of defined BWPs comprises a downlink half duplex (HD) BWP of the plurality of defined BWPs and the second defined BWP of the plurality of defined BWPs comprises an uplink HD BWP of the plurality of defined BWPs, and wherein the first bandwidth of the first BWP of the first FD frequency-based BWP configuration and the second bandwidth of the second BWP of the first FD frequency-based BWP configuration are non-overlapping in frequency.

29. The apparatus of claim 27, wherein the first FD frequency-based BWP configuration is an uplink and downlink BWP pair set of a plurality of uplink and downlink BWP pair sets including a plurality of BWPs, and wherein two or more uplink and downlink BWP pair sets are defined for bandwidth of a downlink half duplex (HD) BWP and an uplink HD BWP of the plurality of defined BWPs and include a first uplink and downlink BWP pair set of the first FD frequency-based BWP configuration configured to support FD operation and a second uplink and downlink BWP pair set configured to support HD operation.

30. The apparatus of claim 27, wherein the first FD frequency-based BWP configuration is an uplink and downlink BWP pair set of a plurality of uplink and downlink BWP pair sets including a plurality of BWPs, and wherein two or more uplink and downlink BWP pair sets are defined for bandwidth of a downlink half duplex (HD) BWP and an uplink HD BWP of the plurality of defined BWPs and expand the downlink HD BWP to at least a first BWP configuration configured to support FD operation and a second BWP configuration configured to support HD operation and expand the uplink HD BWP to at least a third BWP configuration configured to support FD operation and a fourth BWP configuration configured to support HD operation.

* * * * *